(12) United States Patent
Vedantham et al.

(10) Patent No.: US 7,376,150 B2
(45) Date of Patent: May 20, 2008

(54) POINT-TO-POINT REPAIR RESPONSE MECHANISM FOR POINT-TO-MULTIPOINT TRANSMISSION SYSTEMS

(75) Inventors: Ramakrishna Vedantham, Irving, TX (US); David Leon, Irving, TX (US); Igor Curcio, Tampere (FI); Rod Walsh, Tampere (FI)

(73) Assignee: Nokia Corporation, Espoo (FI)

( * ) Notice: Subject to any disclaimer, the term of this patent is extended or adjusted under 35 U.S.C. 154(b) by 476 days.

(21) Appl. No.: 10/903,260

(22) Filed: Jul. 30, 2004

(65) Prior Publication Data

US 2006/0023652 A1 Feb. 2, 2006

(51) Int. Cl.
*H04J 3/16* (2006.01)
(52) U.S. Cl. .................. 370/469; 370/312; 370/328; 709/218; 709/236; 714/774
(58) Field of Classification Search .............. 370/312, 370/328, 349, 395.52, 469; 709/218, 236; 714/774, 785
See application file for complete search history.

(56) References Cited

U.S. PATENT DOCUMENTS

| | | | | |
|---|---|---|---|---|
| 5,572,678 | A * | 11/1996 | Homma et al. | 709/227 |
| 7,017,102 | B1 * | 3/2006 | Kristensson et al. | 714/786 |
| 2003/0005387 | A1 * | 1/2003 | Tsunoda | 714/785 |
| 2003/0016673 | A1 * | 1/2003 | Pendakur et al. | 370/394 |
| 2003/0021291 | A1 * | 1/2003 | White et al. | 370/466 |
| 2005/0256975 | A1 * | 11/2005 | Kaniz et al. | 709/250 |

FOREIGN PATENT DOCUMENTS

WO WO 03/105353 12/2003

OTHER PUBLICATIONS

"Nack-Oriented Reliable Multicast (NORM) Building Blocks", Adamson et al., IETF Standard-Working-Draft, Internet Engineering Task Force, IETF, CH, vol. rmt, No. 8, Nov. 2003.
RMT Internet-Draft, Paila et al., FLUTE—File Delivery over Unidirectional Transport draft-ietf-rmt-flute-08.txt, Jun. 2004, 35 page document.
Network Working Group, Luby et al., Forward Error Correction (FEC) Building Block, Dec. 2002, 16 page document.
Network Working Group, Luby et al., Compact Forward Error Correction (FEC) Schemes, Feb. 2004, 13 page document.
[RMT] draft-ietf-luby-rmt-bb-fec-supp-simple-00.txt, Luby, Simple Forward Error Correction (FEC) Schemes, Jun. 2004, 12 page document.

* cited by examiner

*Primary Examiner*—Danh Le

(57) ABSTRACT

This invention relates to a method, a system, a transmitter, a network element, a receiver and software applications in a system for transmitting data symbols, wherein one or more data symbols are transmitted from a transmitter to one or more receivers within a point-to-multipoint transmission session, wherein said data symbols are furnished with first-type headers obeying a file delivery protocol, wherein one or more repair data symbols are transmitted from a repair server to one specific receiver of said receivers within a point-to-point repair session, and wherein said repair data symbols are furnished with one or more second-type headers at least partially obeying said same file delivery protocol.

53 Claims, 11 Drawing Sheets

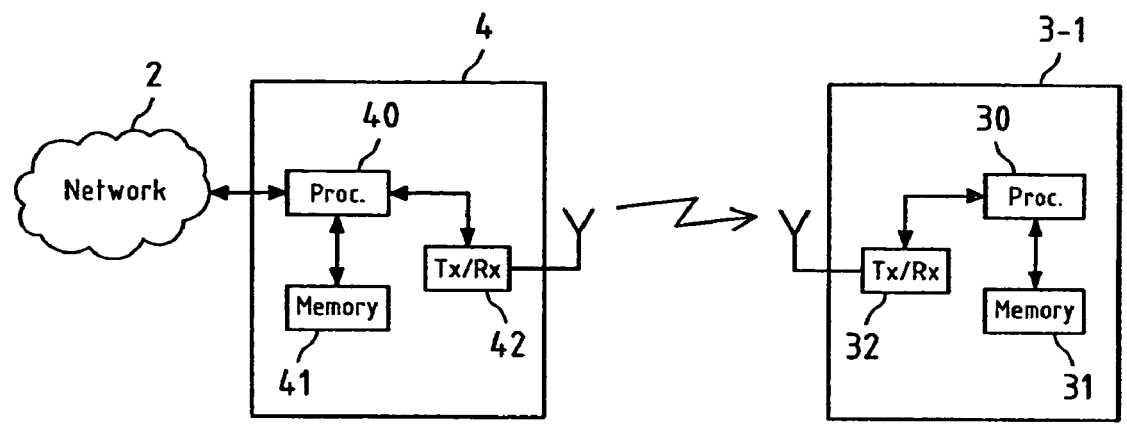
Fig.1c
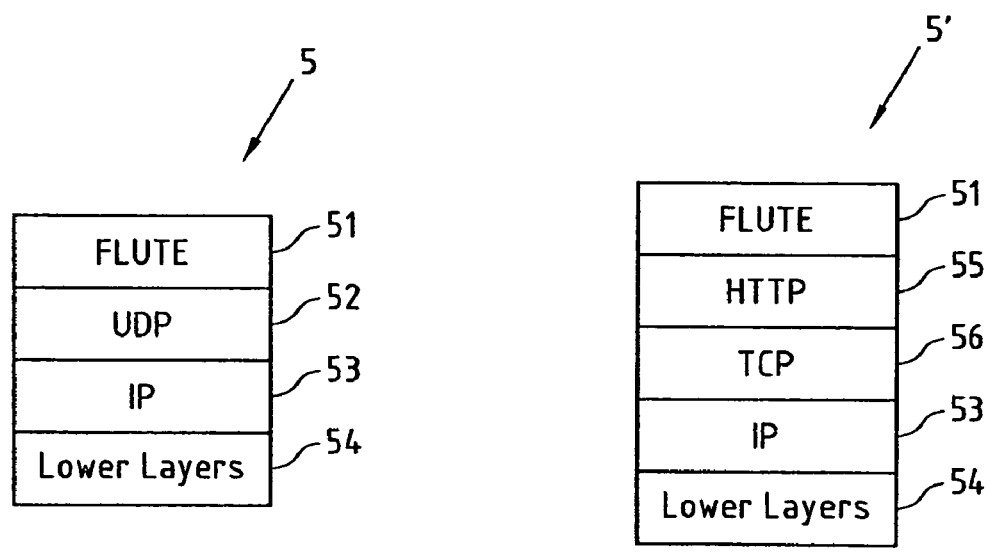
Fig.2a
Fig.2b

POINT-TO-POINT REPAIR RESPONSE MECHANISM FOR POINT-TO-MULTIPOINT TRANSMISSION SYSTEMS

FIELD OF THE INVENTION

This invention relates to a method, a system, a transmitter, a network element, a receiver and software applications in a system for transmitting data symbols, wherein one or more data symbols are transmitted from a transmitter to one or more receivers within a point-to-multipoint transmission session, and wherein one or more repair data symbols are transmitted from a repair server to one specific receiver of said receivers within a point-to-point repair session.

BACKGROUND OF THE INVENTION

For point-to-multipoint (PtM) services (also denoted as one-to-many services) over systems such as the Internet Protocol (IP) multicast, the IP Data Casting (IPDC) and the Multimedia Broadcast/Multicast Services (MBMS), file delivery such as for instance the download of multimedia files is an important service.

However, many of the features for delivering files over point-to-point (PtP) protocols, such as for instance the File Transfer Protocol (FTP) and the Hypertext Transfer Protocol (HTTP), are problematic for PtM scenarios. In particular, the reliable delivery of files, i.e. the guaranteed delivery of files, using similar PtP acknowledgement (ACK) protocols such as the Transmission Control Protocol (TCP) is not feasible.

The Reliable Multicast Transport (RMT) Working Group of the International Engineering Task Force (IETF) is currently in the process of standardizing two categories of error-resilient multicast transport protocols. In the first category, reliability is implemented through the use of (proactive) Forward Error Correction (FEC), i.e. by sending a certain amount of redundant data that can help a receiver in reconstructing erroneous data; in the second category, reliability is implemented through the use of receiver feedback, i.e. by the receiver sending acknowledgments (ACKs) or non-acknowledgements (NACKs) concerning received data.

Asynchronous Layered Coding (ALC) is a protocol instantiation belonging to the first category, while the NACK-Oriented Reliable Multicast (NORM) protocol belongs to the second category. The access networks on which these protocols could be used include, but are not limited to, wireless multiple-access networks such as the Universal Mobile Telecommunications System (UMTS, including the Global System for Mobile Communications Evolution Radio Access Network (GERAN) and the UMTS Terrestrial Radio Access Network (UTRAN)), Wireless Local Area Networks (WLAN), Digital Video Broadcasting—Terrestrial (DVB-T) networks and Digital Video Broadcasting—Satellite (DVB-S) networks.

NACK messages are not generally NORM-specific, but they can also be used in connection with other protocols or systems, for instance with systems that support sessions that are controlled by the File Delivery over Unidirectional Transport (FLUTE) protocol.

FLUTE is a one-to-many transport protocol that builds on FEC and ALC building blocks. It is intended for file delivery from transmitter(s) to receiver(s) over unidirectional systems. It has specializations which make it suitable to wireless PtM systems. The details of the FLUTE protocol are discussed in more detail in the publication entitled "FLUTE—File Delivery over Unidirectional Transport" (Internet Draft) prepared by the above-mentioned RMT Working Group of the IETF.

The use of FLUTE is for instance specified by the Third Generation Partnership Project (3GPP) for file download in sessions of the MBMS system. FEC may or may not have been used in such FLUTE sessions. In any case, not all receivers in the session can be expected to receive the whole file when the session ends. To this end, 3GPP is in the process of defining PtP repair sessions, wherein the receivers are allowed to signal requests for transmissions of repair data symbols, for instance data symbols that were not received correctly by a receiver, to a transmitter or repair server via NACK messages in order to receive enough data symbols and then to be able to reconstruct the downloaded content. In said NACK messages, said repair data symbols required by said receivers have to be sufficiently identified, so that the repair server is able to determine which data symbols have to be transmitted or re-transmitted.

When a receiver is scheduled for a repair session, a PtP session, for instance an HTTP session, is then established between the receiver and the repair server, in which the required repair data symbols are transmitted to the receiver.

Although the data symbols are transmitted in a PtM session, which is based on an unreliable protocol, as for instance the User Datagram Protocol (UDP), and the repair data symbols are transmitted in a PtP session, which is based on a reliable protocol, as for instance the Transmission Control Protocol (TCP), repair data symbols are currently furnished with the same header information as the data symbols. This header information comprises:
- a default Layered Coding Transport (LCT) header,
- an LCT Header Extensions section, and
- an FEC Payload ID section.

The LCT header comprises:
- a first section with an array of flags, an LCT header length field and a Code Point field for signalling the FEC Encoding ID,
- a Congestion Control Information (CCI),
- a Transport Session Identifier (TSI),
- a Transport Object Identifier (TOI),
- a Sender Current Time (SCT), and
- an Expected Residual Time (ERT).

However, repair data symbols should be sent in the most efficient way such that the receiver can easily identify the repair data symbols and finish decoding the file(s) that were partially downloaded during the multicast/broadcast PtM session. The overhead incurred in the transmission of repair data symbols, which usually represents a re-transmission of already sent data symbols, should thus be kept small to reduce the PtP response time while keeping the receiver operations simple.

SUMMARY OF THE INVENTION

Thus there exists a need for a more efficient method, system, transmitter, network element, receiver and software application in a system for transmitting data symbols in both point-to-multipoint and point-to-point sessions.

It is proposed a method for transmitting data symbols, comprising transmitting one or more data symbols from a transmitter to one or more receivers within a point-to-multipoint transmission session, wherein said data symbols are furnished with first-type headers obeying a file delivery protocol; and transmitting one or more repair data symbols from a repair server to one specific receiver of said receivers within a point-to-point repair session, wherein said repair data symbols are furnished with one or more second-type headers at least partially obeying said same file delivery protocol.

Said system may represent any wireless or wire-bound system, wherein data symbols are transmitted from at least one transmitter to one or more receivers. Said point-to-multipoint transmission may either be a broadcast transmission, in which all receivers are addressed by said transmitter, or a multicast transmission, in which only a sub-group of all receivers is addressed by said transmitter. Said system may for instance be deployed in the context of UMTS, a LAN, a WLAN, DVB-T or DVB-S, and may be intended to distribute content such as for instance multimedia files to a plurality of receivers. Said transmission of said one or more data symbols may be performed on uni-directional or bi-directional transmission links.

Said transmitted data symbols may for instance be related to content that is to be transferred to said receivers. This content may be segmented and processed to allow for the transmission to said receivers, whereas said data symbols are to be understood as the result of this segmentation and processing. For instance, one data symbol may represent one or more encoding symbols (for instance, an encoding packet) obtained by FEC encoding of a transport object, e.g. a multimedia file, or parts thereof. Therein, each data symbol may represent only one information-carrying unit, for instance one binary digit (bit), or a plurality of information-carrying units.

Said data symbols are furnished with first-type headers obeying a file delivery protocol, for instance the FLUTE protocol. Said furnishing may for instance be performed by adding said header to said data symbols or by other techniques of creating an association between said first-type header and said data symbols. Said first-type data symbols and their associated data symbols may for instance form a FLUTE packet. The first-type headers may for instance contain information related to the logical transfer of said data symbols between protocol entities at said transmitter and said receivers.

At least at one of said receivers, which is denoted as specific receiver, a reception of repair data symbols is required, which may be due to a plurality of reasons such as for instance incorrect reception or loss of transmitted data symbols. Said specific receiver may become aware of the requirement to receive repair data symbols during said transmission of data symbols or after the transmission of data symbols has finished.

Said repair data symbols may for instance be simple copies of the transmitted data symbols that were not received by said specific receiver. Equally well, they may be different with respect to both encoding and actual content. Repair data symbols serve the purpose of providing said specific receiver with that amount of information that is required by said specific receiver.

In order to trigger a transmission of repair data symbols from said repair server, said specific receiver may signal repair data information to said repair server in a repair request message. This may take place in a point-to-point transfer. The repair server thus is enabled to generate the appropriate repair data symbols and to transmit them to the specific receiver. This transfer of repair data symbols is performed in a point-to-point repair session.

Said repair data symbols are furnished with one or more second-type headers at least partially obeying said same file delivery protocol. Said second-type data symbols headers thus may for instance completely obey said file delivery protocol, which then is required to define at least two different types of data symbols headers. Equally well, said second-type headers may represent a modification of one or more data symbols headers that are defined by said file delivery protocol, wherein said modification may comprise all forms of adding, removing or changing parameters of said first-type headers as well as combining several possibly modified first-type headers. Preferably, said modifications may only comprise a reduction of said first-type headers by removing at least one parameter of said first-type header. Said furnishing may for instance be accomplished by adding a second-type header to a repair data symbol, or by other techniques of associating said repair data symbols with said second-type headers. For instance, several repair data symbols may be combined into one HTTP packet, and one second-type header may also be included into said HTTP packet, wherein said second-type header then comprises information valid for all repair data symbols in said HTTP packet.

The present invention thus proposes to use different types of headers for the transfer of data symbols on the one hand, and repair data symbols on the other hand. This proposal accounts for the fact that data symbols are transmitted in point-to-multipoint sessions that are based on unreliable protocols (e.g. UDP), whereas repair data symbols are transmitted in point-to-point session that are based on reliable protocols (e.g. TCP), so that at least some of the parameters that have to be comprised in first-type headers that are used for the data symbols do not have to be contained in second-type data symbols headers that are used by repair data symbols. This approach according to the present invention allows for a more efficient transfer of repair data symbols with a significantly reduced overhead. With the second-type headers at least partially obeying said file delivery protocol, no or only minor changes may be required at both the repair server's and the receivers' protocol instances and the corresponding implementations.

According to the present invention, said first-type header may contain at least one parameter that is not contained in said second-type header, and said parameter may be related to point-to-multipoint transmission. Said parameter may for instance be a Congestion Control Information (CCI), a Sender Current Time (SCT), an Expected Residual Time (ERT), and in some cases a Transport Session Identifier (TSI).

According to the present invention, in said point-to-point repair session, said file delivery protocol may use the services of the Transmission Control Protocol.

According to the present invention, in said point-to-point repair session, said file delivery protocol may use the services of the Hypertext Transfer Protocol. This protocol may in turn use the services of the Transmission Control Protocol.

According to the present invention, said file delivery protocol may be the File Delivery over Unidirectional Transport, FLUTE, protocol, and said data symbols and said repair data symbols may represent FLUTE encoding symbols. Said FLUTE encoding symbols may for instance be obtained by forward error correction encoding of portions of a transport object that is to be delivered to said one or more receivers in said point-to-multipoint session. Each data symbol may for instance represent one or several encoding symbols.

According to the present invention, said FLUTE protocol may use the services of the Hypertext Transfer Protocol, HTTP, and said HTTP may transfer HTTP packets between said repair server and said specific receiver. To this end, said data symbols and their associated one or more second-type headers may be incorporated as payload into said HTTP packets.

According to a first embodiment of the present invention, a combination of one FLUTE encoding symbol and one associated second-type header forms a compressed FLUTE packet, and at least one of said HTTP packets comprises an HTTP packet header and one or more of said compressed FLUTE packets.

According to said first embodiment of the present invention, said second-type header of said compressed FLUTE packets at least comprises a portion of a Layered Coding Transport header, an identifier of said FLUTE encoding symbol in said compressed FLUTE packet, and a size of said FLUTE encoding symbol. Said Layered Coding Transport header may stem from the Layered Coding Transport building block the FLUTE protocol layer is built on top of. Said identifier of said FLUTE encoding symbol may for instance be an FEC Payload ID providing a Source Block Number (SBN) and an Encoding Symbol Identifier (ESI) corresponding to said FLUTE encoding symbol.

According to a second embodiment of the present invention, said at least one HTTP packet has a multipart Multipurpose Internet Mail Extensions, MIME, structure, and said compressed FLUTE packets are separated from said HTTP packet header and from each other by MIME boundaries. Said separation my MIME boundaries then may allow to skip a parameter for the encoding symbol size in said second-type headers.

According to said second embodiment of the present invention, said second-type header of said compressed FLUTE packets comprises a portion of a Layered Coding Transport header, and an identifier of said FLUTE encoding symbol in said compressed FLUTE packet.

According to a third embodiment of the present invention, at least one of said HTTP packets comprises an HTTP packet header, one or more blocks that comprise at least two FLUTE encoding symbols and respective associated identifiers, and one respective second-type header for each of said blocks, wherein each respective second-type header is valid for all FLUTE encoding symbols of a respective block. The combination of FLUTE encoding symbols into blocks allows to use only one second-type header for each block instead of having to provide one second-type header per FLUTE encoding symbol. Said FLUTE encoding symbols combined into a block advantageously have the same characteristics, e.g. same size, same TOI and same TSI, and the characteristics that are different for each FLUTE encoding symbol then may be incorporated into said blocks of FLUTE encoding symbols.

According to said third embodiment of the present invention, said at least one HTTP packet has a MIME structure, and said HTTP packet header, said blocks and said second-type headers are mutually separated by MIME boundaries. It may then not be required to explicitly transmit the size of the block of FLUTE encoding symbols.

According to said third embodiment of the present invention, said respective second-type headers comprise a portion of a Layered Coding Transport header and a size of said FLUTE encoding symbols in said respective blocks.

According to said third embodiment of the present invention, at least one of said blocks comprises a FLUTE encoding symbol, a respective associated identifier, a respective Layered Coding Transport header length and at least one Layered Coding Transport header extension. Said LCT header extension may for instance be an EXT_FTI or an EXT_FDT. Said respective LCT header length may indicate if one or more of said LCT header extensions are present or not.

According to a fourth embodiment of the present invention, at least one of said HTTP packets comprises an HTTP packet header, one second-type header and one or more blocks that comprise at least two FLUTE encoding symbols. Then only one second-type header is used for all FLUTE encoding symbols contained in said HTTP packet, which serves as an index object that provides all header information for all of said FLUTE encoding symbols. Said second-type header then may for instance be segmented into sub-headers that are related to each of said blocks of FLUTE encoding symbols.

According to said fourth embodiment of the present invention, said at least one HTTP packet has a MIME structure, and said HTTP packet header, said one second-type header and said one or more blocks are mutually separated by MIME boundaries. This may allow to skip the explicit transmission of the size of the blocks of FLUTE encoding symbols.

According to said fourth embodiment of the present invention, said second-type header comprises one respective sub-header for each respective block in said HTTP packet, and each of said respective sub-headers comprises a portion of a Layered Coding Transport header, the size of said FLUTE encoding symbols in said respective block, the number of FLUTE encoding symbols in said respective block, and one identifier for each FLUTE encoding symbol in said respective block.

According to said fourth embodiment of the present invention, at least one of said sub-headers comprises one Layered Coding Transport header length for each FLUTE encoding symbol in said respective block, and at least one Layered Coding Transport header extension for at least one of said FLUTE encoding symbols in said respective block. Said LCT header extension may for instance be an EXT_FDT or an EXT_FTI. Said LCT header length may indicate if one or more of said LCT header extensions are present or not.

According to the present invention, said second-type header may further comprise an identifier of said point-to-multipoint transmission session. Said identifier may for instance be a Transport Session Identifier (TSI). However, if only one transmission session is present or if it is implicitly clear from the context which transmission session said FLUTE encoding symbols refer to, said identifier of said transmission session may not be required.

According to the present invention, said second-type header may further comprise an identifier of a transport object said FLUTE encoding symbols are related to. This identifier may for instance be a Transport Object Identifier (TOI). However, if only one transport object is transmitted per transport session, said identifier may not be required.

According to the present invention, said second-type header may further comprise Layered Coding Transport header extensions. These LCT header extensions may for instance be an EXT_FTI or an EXT_FDT.

According to the present invention, said portion of said Layered Coding Transport header comprises a Layered Coding Transport version number, a Congestion Control flag, a reserved space, a Transport Session Identifier flag, a Transport Object Identifier TOI flag, a Half-word flag, a Sender Current Time flag, an Expected Residual Time flag, a Close Session flag, a Close Object flag, a Layered Coding Transport header length, and a Code Point. Said portion of said Layered Coding Transport header may for instance be 4 bytes long.

It is further proposed a system for transmitting data symbols, comprising a transmitter, one or more receivers, and a repair server, wherein one or more data symbols are transmitted from said transmitter to said one or more receivers within a point-to-multipoint transmission session, wherein said data symbols are furnished with first-type headers obeying a file delivery protocol, wherein one or more repair data symbols are transmitted from said repair server to one specific receiver of said receivers within a point-to-point repair session, and wherein said repair data symbols are furnished with one or more second-type headers at least partially obeying said same file delivery protocol.

It is further proposed a transmitter in a system for transmitting data symbols, comprising means arranged for transmitting one or more data symbols from said transmitter to one or more receivers within a point-to-multipoint transmission session, wherein said data symbols are furnished with first-type headers obeying a file delivery protocol, wherein one or more repair data symbols are transmitted from a repair server to one specific receiver of said receivers within a Point-to-point repair session, and wherein said repair data symbols are furnished with one or more second-type headers at least partially obeying said same file delivery protocol. Said transmitter and said repair server may be co-located or even identical.

It is further proposed a network element in a system for transmitting data symbols, wherein one or more data symbols are transmitted from a transmitter to one or more receivers within a point-to-multipoint transmission session, and wherein said data symbols are furnished with first-type headers obeying a file delivery protocol, said network element comprising means arranged for transmitting one or more repair data symbols from said network element to one specific receiver of said receivers within a Point-to-point repair session, wherein said repair data symbols are furnished with one or more second-type headers at least partially obeying said same file delivery protocol. Said transmitter and said network element may be co-located or even identical. Said network element may for instance be a repair server.

It is further proposed a software application executable in a network element of a system for transmitting data symbols, wherein one or more data symbols are transmitted from a transmitter to one or more receivers within a point-to-multipoint transmission session, and wherein said data symbols are furnished with first-type headers obeying a file delivery protocol, the software application comprising program code for causing the network element to transmit one or more repair data symbols from said network element to one specific receiver of said receivers within a Point-to-point repair session, wherein said repair data symbols are furnished with one or more second-type headers at least partially obeying said same file delivery protocol.

Said software application may also be a computer program product, comprising program code that is stored on a medium, as for instance a memory of said network element.

It is further proposed a receiver in a system for transmitting data symbols, comprising means arranged for receiving one or more data symbols transmitted from a transmitter to one or more receivers within a point-to-multipoint transmission session, wherein said data symbols are furnished with first-type headers obeying a file delivery protocol; and means arranged for receiving one or more repair data symbols from a repair server within a point-to-point repair session, wherein said repair data symbols are furnished with one or more second-type headers at least partially obeying said same file delivery protocol.

It is further proposed a software application executable in a receiver of a system for transmitting data symbols, the software application comprising program code for causing the receiver to receive one or more data symbols transmitted from a transmitter to one or more receivers within a point-to-multipoint transmission session, wherein said data symbols are furnished with first-type headers obeying a file delivery protocol; and program code for causing the receiver to receive one or more repair data symbols from a repair server within a Point-to-point repair session, wherein said repair data symbols are furnished with one or more second-type headers at least partially obeying said same file delivery protocol.

Said software application may also be a computer program product, comprising program code that is stored on a medium, as for instance a memory of said receiver.

These and other aspects of the invention will be apparent from and elucidated with reference to the embodiments described hereinafter.

BRIEF DESCRIPTION OF THE DRAWINGS

In the figures show:

FIG. 1c: a schematic presentation of the transmission of repair data symbols in a PtP repair session according to the present invention;

FIG. 2a: a schematic presentation of the protocol stack used for the transmission of data symbols in the PtM transmission session according to the present invention;

FIG. 2b: a schematic presentation of the protocol stack used for the transmission of repair data symbols in the PtP repair session according to the present invention;

DETAILED DESCRIPTION OF THE INVENTION

As an initial remark, it should be noted that the subject-matter of the introductory part of this patent application may be used to support this detailed description.

The present invention proposes to use two different header types for the PtM transmission of data symbols from a transmitter to a plurality of receivers on the one hand, and the PtP transmission of repair data symbols from a repair server to one of said receivers on the other hand. This accounts for the fact that the transmission of data symbols is based on unreliable protocols, as for instance the UDP, and thus requires more overhead information as the transmission of repair data symbols, which is based on more reliable protocols such as for instance the TCP.

In this detailed description of the invention, frequently reference will be made to the case where FLUTE/UDP is used in case of PtM transmission and where HTTP/TCP is used in case of PtP transmission. It should be noted that this choice is only of exemplary nature and that the present invention may equally well be applied in similar scenarios where data symbols, which obey a certain protocol and are transmitted in a PtM scenario first, then have to be re-transmitted in a PtP scenario and therein at least partially have to stick to said protocol.

Figure 1A:
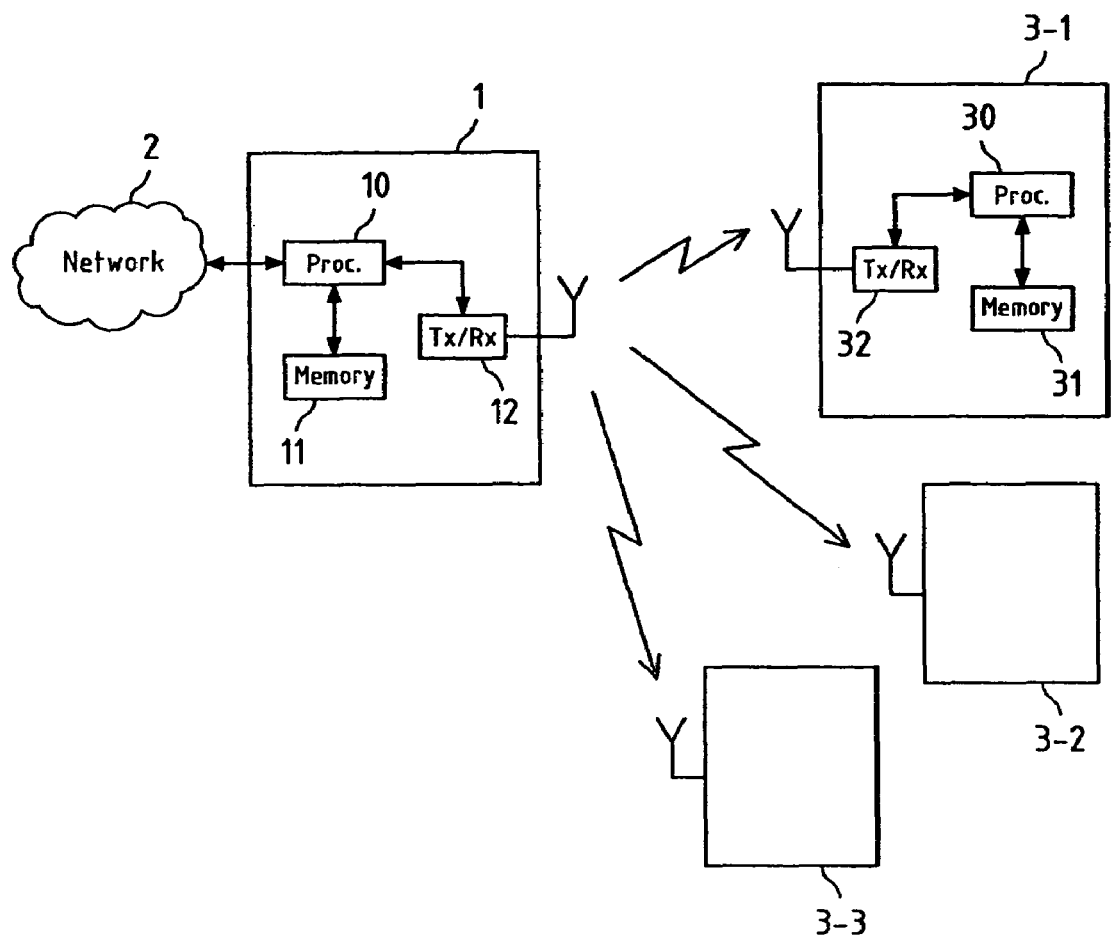
FIG. 1a: A schematic presentation of a transmission of data symbols in a point-to-multipoint (PtM) transmission session according to the present invention.

FIG. 1*a* depicts a PtM session wherein data symbols are transmitted from a transmitter 1 to a plurality of receivers 3-1 . . . 3-3. The transmitter is connected to a network 2, for instance the Internet, and thus has access to content that is to be distributed to said plurality of receivers in a broadcast or multicast session, for instance in the scope of the 3GPP MBMS system. To this end, the transmitter comprises a processor 10, a memory 11 and a transmission/reception (Tx/Rx) instance. Content is collected from the network 2 under the control of the processor 10, possibly intermediately stored in the memory 11 and then coded and modulated for transmission via the Tx/Rx instance 12 to the Tx/Rx instances 32 of the receivers 3-1 . . . 3-3. Said processor 10 is understood to implement functionality of all layers of the ISO/OSI protocol stack, in particular the encoding of content into FLUTE encoding symbols that, together with a FLUTE header, form a FLUTE packet, and the generation of these FLUTE headers is performed by said processor 10.

At said receivers 3-1 . . . 3-3, of which only specific receiver 3-1 is depicted in more detail, the FLUTE packets are received via Tx/Rx instance 32, demodulated and decoded by the processor 30 and stored in memory 31 as input for any type of application running in said receiver or an attached device.

Figure 1B:
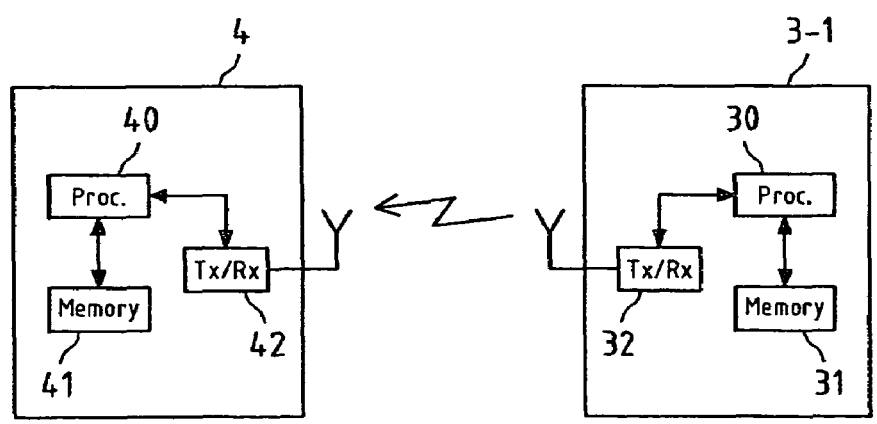
FIG. 1b: a schematic presentation of the signalling of a request for repair data symbols in a point-to-point (PtP) repair session according to the present invention.

FIG. 1*b* depicts the case when FLUTE packets have not been received correctly at said specific receiver 3-1, or when not enough FLUTE packets were received at said specific receiver 3-1, so that the transmission of repair data symbols that allow said specific receiver 3-1 to reconstruct the complete content that is distributed by said transmitter 1 has to be requested. To this end, a repair request message is sent from receiver 3-1 to a repair server 4, which has a similar set-up as transmitter 1 and may even be identical to said transmitter 1. The transmission of said repair request messages may for instance take place in an HTTP session.

Said repair server 4 then processes said repair request message, which contains information related to the FLUTE packets required by said specific receiver 3-1.

FIG. 1*c* depicts the outcome of this processing of the repair server 4. When the repair server 4 has determined the FLUTE encoding symbols that have to be sent to the specific receiver 3-1 as repair data symbols in a repair response, it fetches information required to generate these repair data symbols from the network 2, for instance the transport object or parts thereof to which the required FLUTE encoding symbols relate. Based on this transport object, the repair data symbols (FLUTE encoding symbols) are generated by processor 40, furnished with a compressed FLUTE header to obtain a compressed FLUTE packet, and then transmitted to the specific receiver 3-1 in a repair response message.

According to the present invention, the repair server 4 thus uses a compressed FLUTE header for the repair data symbols as compared to the FLUTE header that is used for the data symbols in the FLUTE packet, i.e. the compressed FLUTE header comprises less parameters or information than said FLUTE header. For instance, all parameters that are specific to PtM transmission and are not required in a PtP transmission may be skipped in said compressed FLUTE header. It is also possible that several FLUTE encoding symbols share the same compressed FLUTE header.

FIG. 2*a* schematically depicts the protocol stack that is used for the PtM transmission of FLUTE encoding symbols (contained in FLUTE packets) from FLUTE protocol entities at the transmitter 1 to peer FLUTE protocol entities at the receivers 3-1 . . . 3-3. For transferring the FLUTE packets, the FLUTE layer 51 uses the services of the IJDP layer 52, which in turn uses the services of the Internet Protocol (IP) layer 53. The actual transfer of the IP packets is then accomplished by the lower layers 54 of the protocol stack. Therein, a FLUTE header in correspondence with the FLUTE protocol is used.

FIG. 2*b* schematically depicts the protocol stack that is used for the PtP transmission of FLUTE encoding symbols (contained in compressed FLUTE packets) from FLUTE protocol entities at the repair server 4 to peer FLUTE protocol entities at the specific receiver 3-1. In this case, compressed FLUTE headers are used. In contrast to the protocol stack of FIG. 2*a*, the FLUTE protocol layer 51 now uses the PtP transmission service of the underlying HTTP layer 55, which resides on top of the TCP layer 56. To this end, the compressed FLUTE packets are embedded into HTTP packets that then are transferred between peer HTTP entities at the repair server 4 and the specific receiver 3-1. For this transfer, the HTTP/TCP uses the services of the underlying IP layer 53. Similar to FIG. 2*a*, the IP packets are then transferred by the lower layers 54.

First Embodiment of the Invention

Figure 3A:
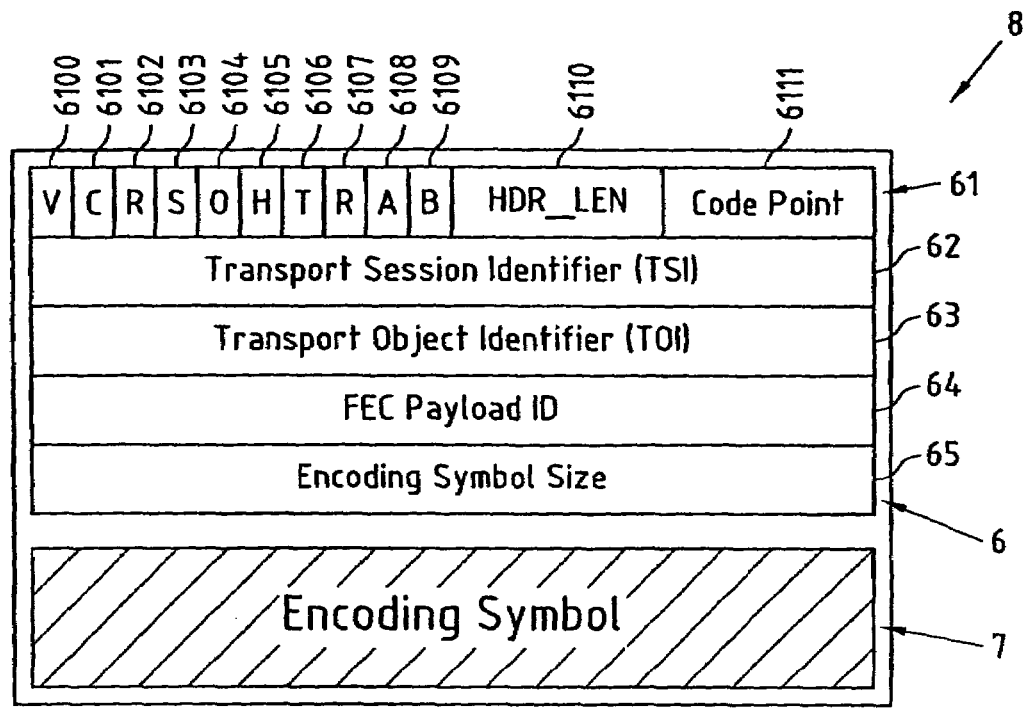
FIG. 3a: a schematic presentation of a compressed FLUTE packet according to a first embodiment of the present invention.

FIG. 3*a* depicts a compressed FLUTE packet 8 according to a first embodiment of the present invention. This compressed FLUTE packet 8 consists of a compressed FLUTE header 6 and one encoding symbol 7 as payload.

Certain fields in the FLUTE packets that are used in the PtM transmission are not needed anymore in the PtP repair session because the repair response is delivered over a reliable TCP link as opposed to FLUTE packets in the PtM session that are delivered over unreliable UDP links. Thus the present invention proposes to tear down the FLUTE packets to a bare minimum while ensuring that only the essential fields are included in the PtP response payload format that is used in the repair session.

The compressed FLUTE header of FIG. 3a comprises the first 4 bytes of the default Layered Coding Transport (LCT) header 61. The corresponding fields 6100-6111 and their meanings remain the same. The fields TSI flag 6103, TOI flag 6104 and Half Word flag 6105 provide information on the size of the TSI field 62 and TOI field 63. The field Code Point 6111 is used to signal the FEC Encoding ID as specified by the FLUTE protocol. Some fields like the Congestion Control flag 6101, the Sender Current Time Flag 6106, the Expected Residual Time flag 6107, the Close Session flag 6108, and the Close Object flag 6109 may not be sent in the PtP response because they are not useful when sent over a reliable PtP connection. The content and sizes in bits of the fields of the LCT header section 61 can be summarized as follows:

V=LCT Version Number (4 bits)
C=Congestion Control flag (2 bits)
R=Reserved (2 bits)
S=TSI flag (1 bit)
O=TOI flag (2 bits)
H=Half-word flag (1 bit)
T=Sender Current Time flag (1 bit)
R=Expected Residual Time flag (1 bit)
A=Close session flag (1 bit)
B=Close object flag (1 bit)
HDR_LEN=LCT header length (8 bits)
CP=Code Point (8 bits)

The TSI field 62 of the compressed FLUTE header 6 may have a size of 0, 16, 32 or 48 bits. The TSI is needed to identify the session. The specific receiver may have participated in more than one FLUTE download session from the same transmitter prior to the PtP repair session. The specific receiver thus has to specify the session for which it is requesting the PtP repair in its PtP repair request. The repair server sends the TSI in the PtP repair response so that the specific receiver will be able to identify the session to which the repair data symbol belongs. The transmitter's address and the TSI uniquely identify the session.

The TOI field 63 of the compressed FLUTE header 6 may have a size of 0, 16, 32, 48, 64, 80, 96 or 112 bits. The TOI is needed to identify the transport object within the session. The FLUTE download may consist of more than one transport object (file) in a single session. For example, an audio file and a video file might have been downloaded in the same FLUTE session. The specific receiver has to specify the transport object for which it is requesting a PtP repair. The (TOI, TSI) uniquely identifies the transport object.

The FEC Payload ID 64 of the compressed FLUTE header 6 depends on the FEC Encoding ID. The mapping between the FEC Encoding ID and FEC Payload ID is the same as was defined in publication RFC 3452 "Forward Error Correction Building Block" and publication RFC 3695 "Compact Forward Error Correction (FEC) Schemes" by the IETF and most recent IETF internet draft "Simple Forward Error Correction Schemes" by M. Luby, Digital Fountain, Jun. 7, 2004 (available at http://www.ietf.org/mail-archive/web/rmt/current/msg00312.html). For example, according to RFC 3695 (adopted by MBMS FLUTE), for FEC Encoding ID=0 (No-Code FEC), the FEC Payload ID consists of the following:

SBN=Source Block Number (2 bytes)
ESI=Encoding Symbol ID (2 bytes).

The field Encoding Symbol Size 65 of the compressed FLUTE header 6 has a length of 2 bytes and contains the size of the encoding symbol 7 that is contained in the compressed FLUTE packet 8 as payload.

Apparently, the compressed FLUTE header 6 according to the first embodiment of the present invention does no longer comprise the Congestion Control Information (CCI), the Sender Current Time (SCT) and the Expected Residual Time (ERT), although these parameters are present in the FLUTE header that is used for the FLUTE/UDP PtM transmission. These parameters support unreliable transport and massive scalability and thus do not have to be included into the compressed FLUTE header 6 that is used for FLUTE/HTTP PtP transmission.

The information of the compressed FLUTE header 6 as given in FIG. 3a may be considered as basic information needed for a reconstruction at the specific receiver 3-1. Other implementations of the invention may add any number of fields to this minimum information. However, different embodiments of the invention may make use of a compressed FLUTE packet that may differ in some ways from the compressed FLUTE packet 8 shown in FIG. 3a. For instance, not all the fields may be present if they can be derived from the context. For example, the TOI field 63 may be omitted if it is assumed that only one single object (file) was delivered in the FLUTE session. In most common embodiments of the present invention, it may be likely that the specific receiver does not request repair data with reference to more than one transmission session. In that case, the TSI is implicit from the context and remains the same for all the packets sent in a PtP repair response. Thus the TSI field may be omitted from the compressed FLUTE headers. The FLUTE packet header 6 as given in FIG. 3 may also comprise further sections, as for instance LCT header extension sections such as EXT_FTI and EXT-FDT.

Furthermore, the repair server 4 may also send the IP address of the transmitter 1 of the PtM transmission session in order to fully identify this session by the transmitter's IP address and the TSI if it cannot be known from the context.

Figure 3B:
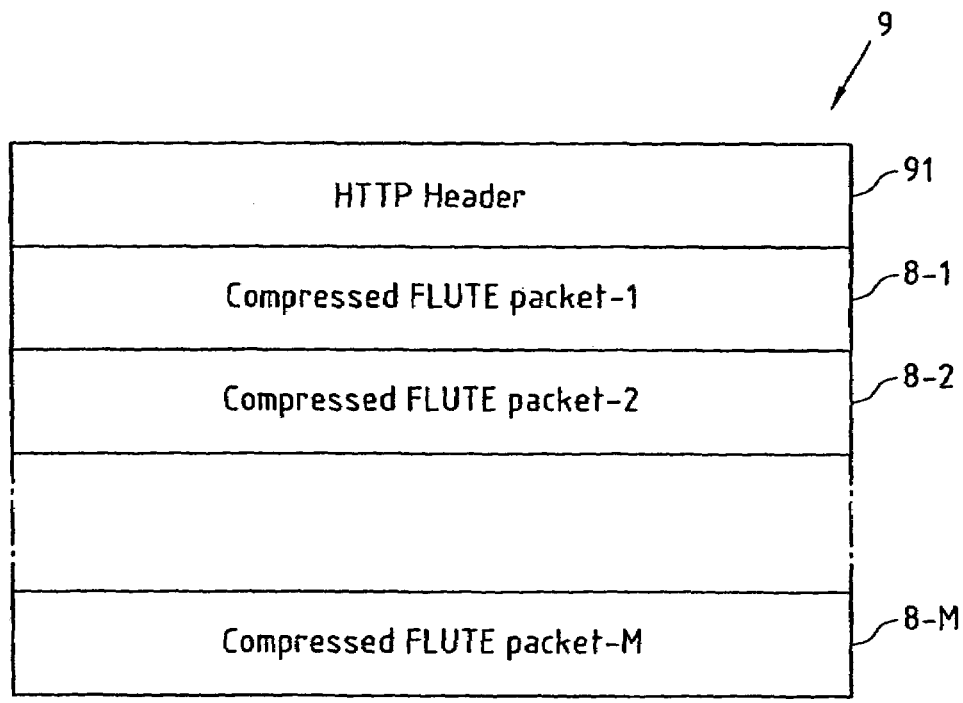
FIG. 3b: a schematic presentation of the embedding of compressed FLUTE packets into an HTTP packet according to the first embodiment of the present invention.

FIG. 3b illustrates the embedding of a plurality of the compressed FLUTE packets 8-1 . . . 8-M of FIG. 3a into an HTTP packet 9, which then is transferred by the HTTP/TCP between the peer protocol entities at the repair server 4 and specific receiver 3-1. Therein, the HTTP packet 9 further comprises an HTTP header 91 with an experimental content-type "x-flutePtP/compressedFlutePkt", which denotes that the message body of the HTTP packet 9 contains compressed FLUTE packets 8-1 . . . 8-M.

The PtP HTTP response transmitted from the repair server 4 to the specific receiver 3-1 then takes the following shape:

```
HTTP/1.1   200   OK
   Content-Type:   x-flutePtP/compressedFlutePkt
   Content-Length:   TOTAL_LENGTH
   Content-Transfer-Encoding:   binary
   Compressed FLUTE Packet - 1
   Compressed FLUTE Packet - 2
      ...
      ...
   Compressed FLUTE Packet - M
```

Therein, the TOTAL_LENGTH is the size of all the compressed FLUTE packets.

Second Embodiment of the Invention

The information contained in the HTTP packet 9 according to the first embodiment of the present invention (see FIGS. 3*a* and 3*b*) may be compressed or rearranged in different ways.

Figure 4A:
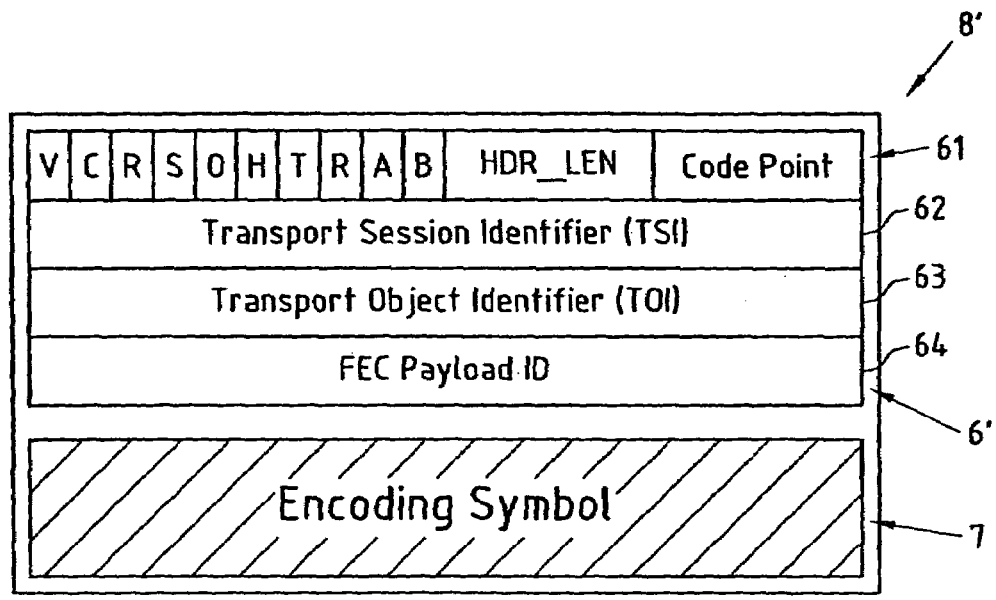
FIG. 4a: a schematic presentation of a compressed FLUTE packet according to a second embodiment of the present invention.

For example, according to a second embodiment of the present invention, a multipart-MIME structure can be used to separate and send compressed FLUTE packets. In a multipart-MIME structure, "boundary strings" separate the constituent parts. So the Encoding Symbol Size field 65 of the compressed FLUTE header 6 of FIG. 3*a* can be omitted, yielding the compressed FLUTE header 6' contained in the compressed FLUTE packet 8' according to FIG. 4*a*.

Figure 4B:
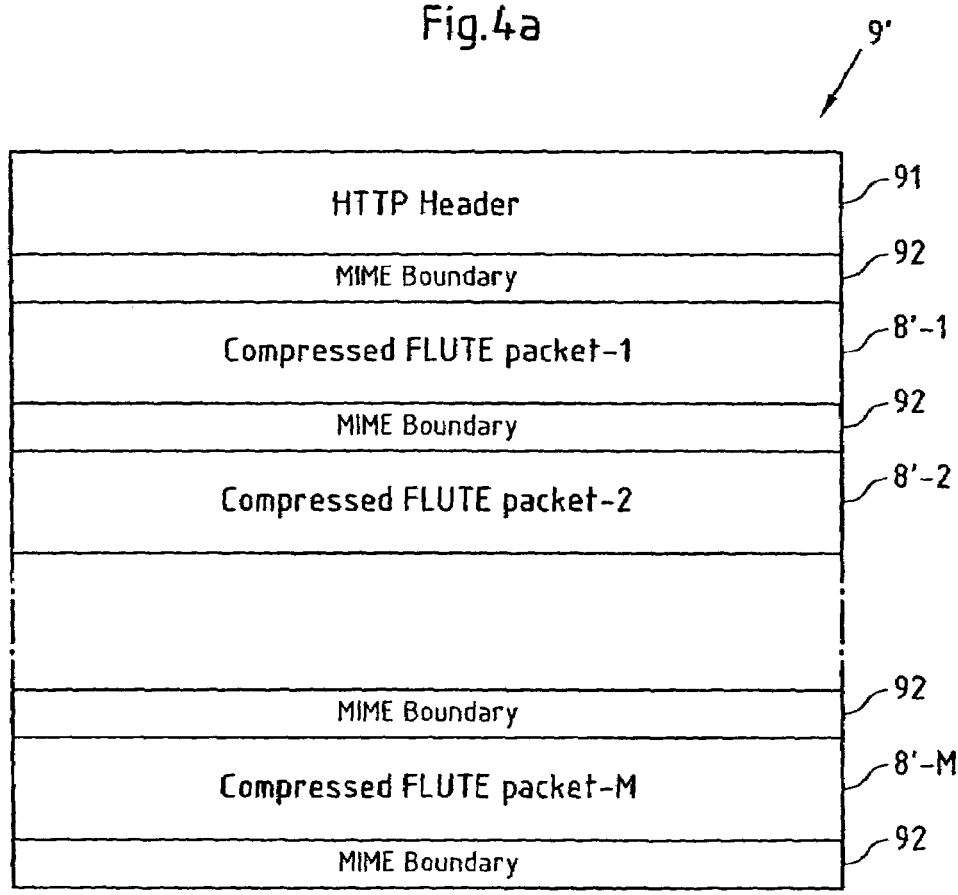
FIG. 4b: a schematic presentation of the embedding of compressed FLUTE packets into an HTTP packet according to the second embodiment of the present invention.

FIG. 4*b* depicts the corresponding HTTP packet 9'. Therein, the HTTP header field "Content-Type" is set to "multipart/mixed". The primary subtype for multipart, "mixed", is intended for use when the HTML body parts are independent and need to be bundled in a particular order. Other relevant content-types, for example "multipart/parallel" or "multipart/related" may also be used. In particular, in a "multipart/parallel" entity, the order of body parts is not significant. The "multipart/related" content-type provides a common mechanism for representing objects that are aggregates of related MIME body parts. Any multipart subtypes that an implementation does not recognize must be treated as being of subtype "multipart/mixed".

According to the second embodiment of the present invention, a custom boundary string (BOUNDARY_P2P_REPAIR_RESPONSE) 92 is thus defined to mark the beginning of each part of a multipart-MIME structure in the HTTP packet 9' of FIG. 4*b*. This boundary string 92 may be as long as 70 characters. It is advantageously chosen in such a way that it does not appear (or appears with vanishing probability) in any body parts. The boundary string after the final part is followed by "—".

The Content-Transfer-Encoding of each part of the multipart-MIME is set to "binary" since the compressed FLUTE packets 8' are inherently binary objects that can be read one byte at a time. The "binary" encoding scheme does not involve any overhead. Other relevant encoding schemes such as "base64" may also be used. The "base64" encoding may result in 33% overhead.

The HTTP packet 9' of FIG. 4*b*, comprising the HTTP header 91, boundary strings 92 and compressed FLUTE packets 8'-1 . . . 8'-M, then can be expressed by means of the following pseudo-code as:

```
HTTP/1.1   200   OK
Content-Type:   multipart/mixed;
boundary = BOUNDARY_P2P_REPAIR_RESPONSE
--BOUNDARY_P2P_REPAIR_RESPONSE
Content-Type:   x-flutePtP/compressedFlutePkt
Content-Transfer-Encoding: binary
Compressed FLUTE Packet - 1
--BOUNDARY_P2P_REPAIR_RESPONSE
Content-Type:   x-flutePtP/compressedFlutePkt
Content-Transfer-Encoding: binary
Compressed FLUTE Packet - 2
    ...
    ...
--BOUNDARY_P2P_REPAIR_RESPONSE
Content-Type:   x-flutePtP/compressedFlutePkt
Content-Transfer-Encoding: binary
Compressed FLUTE Packet - M
--BOUNDARY_P2P_REPAIR_RESPONSE--
```

Third Embodiment of the Invention

According to a third embodiment of the present invention, the information of the multipart MIME PtP HTTP response may also be transmitted in a more efficient way as compared to the second embodiment. This third embodiment will now be described with reference to FIGS. 5*a*-5*c*.

The repair server 4 may process all the FLUTE packets that have the same TSI and TOI and combine their FLUTE encoding symbols 7 into M blocks 7"-m of FLUTE packets that share respective common FLUTE headers 6"-m, wherein the integer m ranges from 1 to M. In this way, a repetition of identical parts of compressed FLUTE headers is avoided.

This can for instance be implemented by using the multipart-MIME structure that is already supported by HTTP. To this end, the following experimental content-types are introduced to identify the content of each part in the multipart-MIME structure:

"x-flutePtP/encSymbolHdr" denotes that the message body contains the common FLUTE header 6"-m that is common to all the encoding symbols in the next part (the block 7"-m of FLUTE encoding symbols) of the multipart-MIME structure.

"x-flutePtP/encSymbolVideo" denotes that the message body contains FLUTE encoding symbols 7-1-m. 7-Mm-m (with their corresponding FEC Payload IDs 64-1-m . . . 64-Mm-m, wherein Mm denotes the number of FLUTE encoding symbols per block 7"-m) corresponding to a video object.

"x-flutePtP/encSymbolAudio" denotes that the message body contains FLUTE encoding symbols 7-1-m . . . 7-Mm-m (with their corresponding FEC Payload IDs 64-1-m . . . 64-Mm-m) corresponding to an audio object.

"x-flutePtP/encSymbolOther" denotes that the message body contains FLUTE encoding symbols 7-1-m . . . 7-Mm-m (with their corresponding FEC Payload IDs 64-1-m . . . 64-Mm-m) corresponding to "other" objects.

Alternatively, some embodiments may choose not to differentiate between different media types and for example use a generic content type like "x-flutePtP/encSymbolData".

Figure 5A:
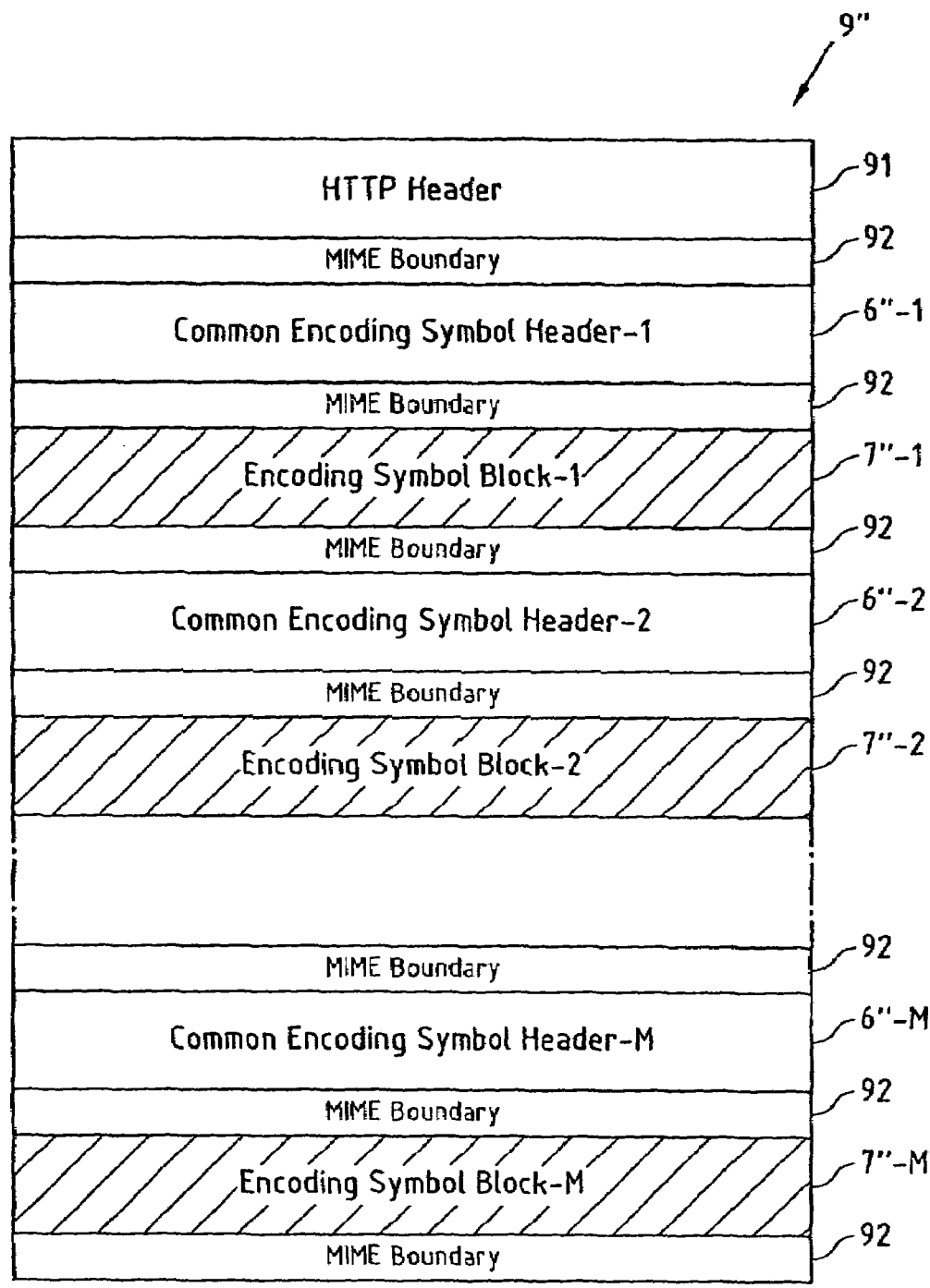
FIG. 5a: a schematic presentation of an HTTP packet according to a third embodiment of the present invention.
Figure 5B:
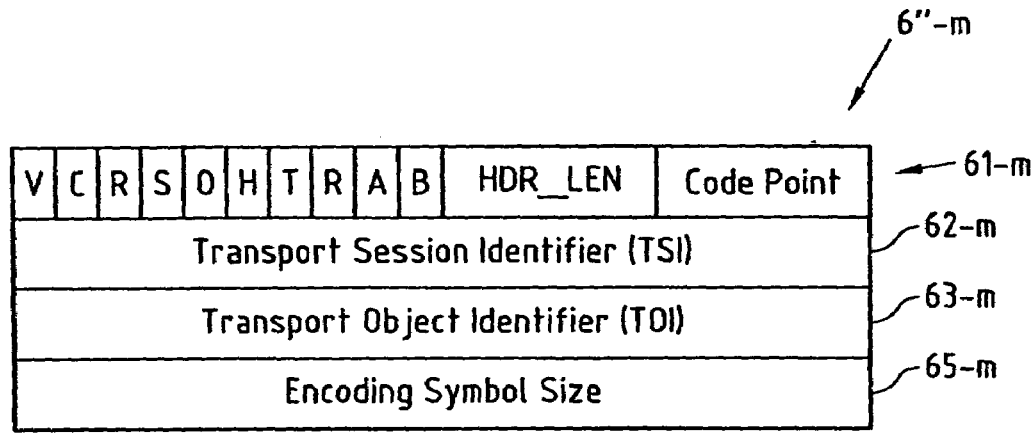
FIG. 5b: a schematic presentation of a common FLUTE header according to the third embodiment of the present invention.
Figure 5C:
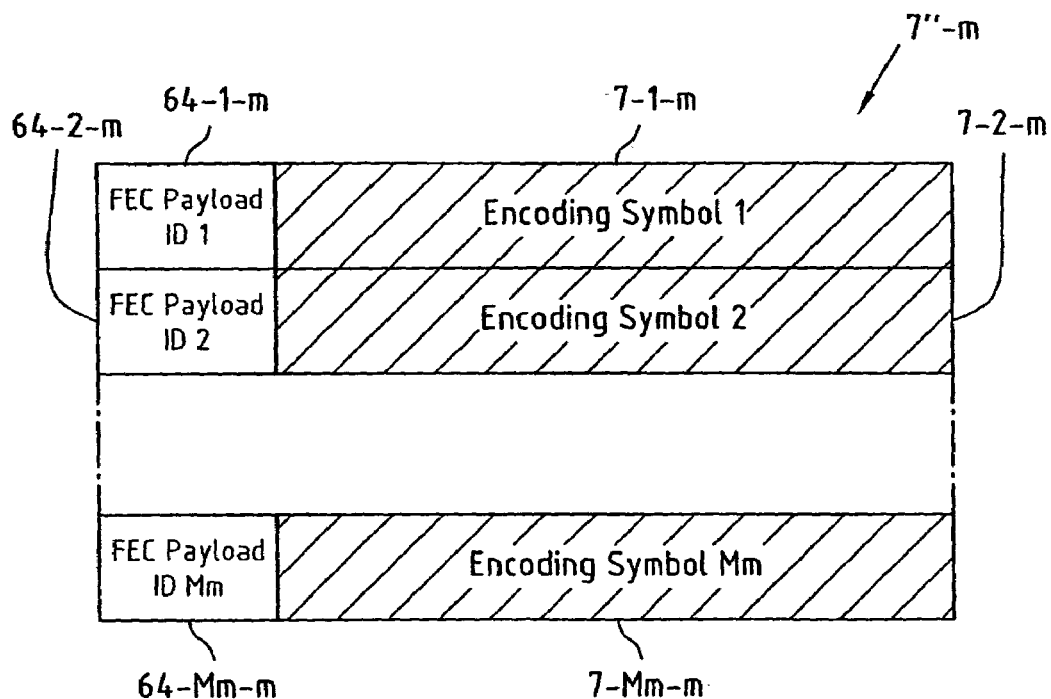
FIG. 5c: a schematic presentation of a block of encoding symbols according to the third embodiment of the present invention.

The resulting structure of the PtP HTTP response 9" is illustrated in FIG. 5*a*, the common FLUTE header 6"-m is shown in FIG. 5*b*, and the format of the block 7"-m of FLUTE encoding symbols is shown in FIG. 5*c*. As can be seen from FIG. 5*c*, the FEC Payload ID 64-1-m. 64-Mm-m for each FLUTE encoding symbol 7-1-m . . . 7-Mm-m (with m denoting an integer ranging from 1 to M) is advantageously moved into the block 7"-m of FLUTE encoding symbols because it is FLUTE-encoding-symbol-specific. Furthermore, as the FLUTE encoding symbols are not mutually separated by MIME boundaries, the size 65-m of the FLUTE encoding symbols 7-1-m . . . 7-Mm-m has to be defined in the common FLUTE header 6"-m, see FIG. 5*b*. The HTTP response 9" of FIG. 5*a* can be expressed by means of pseudo-code as (comments are started with a double forward slash):

```
HTTP/1.1   200   OK
MIME Version:   1.0
Content-Type:   multipart/mixed;
boundary = --BOUNDARY_P2P_REPAIR_RESPONSE
--BOUNDARY_P2P_REPAIR_RESPONSE
Content-Type:   x-flutePtP/encSymbolHdr
Content-Transfer-Encoding: binary
```

-continued

```
// Include the TSI, TOI and Encoding Symbol Size common
// to all FLUTE encoding symbols of the following part.
// (In this example, the following part contains all the
// encoding symbols that belong to a video object).
--BOUNDARY_P2P_REPAIR_RESPONSE
Content-Type:   x-flutePtP/encSymbolVideo
Content-Transfer-Encoding: binary
// Include all the FLUTE encoding symbols (with their FEC
// Payload IDs) that belong to the Video object.
FEC Payload ID - 1, Encoding Symbol - 1
FEC Payload ID -2, Encoding Symbol - 2
...
...
FEC Payload ID - M1, Encoding Symbol M1.
--BOUNDARY_P2P_REPAIR_RESPONSE
Content-Type: x-flutePtP/encSymbolHdr
Content-Transfer-Encoding: binary
// Include the TSI, TOI and Encoding Symbol Size common
// to all FLUTE encoding symbols of the following part.
// (In this example, the following part contains all the
// encoding symbols that belong to the Audio object).
--BOUNDARY_P2P_REPAIR_RESPONSE
Content-Type: x-flutePtP/encSymbolAudio
Content-Transfer-Encoding: binary
// Include all the FLUTE encoding symbols (with their FEC
// Payload IDs) that belong to the Audio object.
FEC Payload ID - 1, Encoding Symbol - 1
FEC Payload ID -2, Encoding Symbol - 2
...
...
FEC Payload ID - M2, Encoding Symbol - M2.
...
...
...
--BOUNDARY_P2P_REPAIR_RESPONSE
Content-Type: x-flutePtP/encSymbolHdr
Content-Transfer-Encoding: binary
// Include the TSI, TOI and Encoding Symbol Size common
// to all FLUTE encoding symbols of the following part.
// (In this example, the following part contains all the
// encoding symbols that belong to the Audio object).
--BOUNDARY_P2P_REPAIR_RESPONSE
Content-Type: x-flutePtP/encSymbolOther
Content-Transfer-Encoding: binary
// Include all the FLUTE encoding symbols (with their FEC
// Payload IDs) that belong to the Audio object.
FEC Payload ID - 1, Encoding Symbol - 1
FEC Payload ID -2, Encoding Symbol - 2
...
...
FEC Payload ID - MM, Encoding Symbol - MM.
--BOUNDARY_P2P_REPAIR_RESPONSE-
```

The third embodiment of the present invention so far assumed that no LCT header extensions such as EXT_FTI and EXT_FDT are contained in the FLUTE header. The block 7"-m of FLUTE encoding symbols as shown in FIG. 5c does thus not comprise any LCT header extensions.

However, if LCT header extensions are used by at least some of the FLUTE encoding symbols, the third embodiment of the present invention as presented so far with reference to FIGS. 5a-5c only has to be altered with respect to the set-up of the block 7"-m of FLUTE encoding symbols. This is exemplarily depicted in FIG. 5d, which serves as an alternative to the block of FIG. 5c and thus maintains the same numerals.

According to FIG. 5c, the block 7"-m of FLUTE encoding symbols still comprises encoding symbols 7-1-m . . . 7-Mm-m, where the integer m ranges from 1 to M, and wherein Mm is the number of encoding symbols per block m and M is the overall number of blocks. As in FIG. 5c, the FEC Payload IDs 64-1-m . . . 64-Mm-m for each encoding symbol are contained in said block before the respective encoding symbol. However, to account for the use of LCT header extensions by at least some of the encoding symbols, LCT header length fields (HDR_LEN) 6110-1-m . . . 6110-Mm-m for each respective encoding symbol 7-1-m . . . 7-Mm-m are introduced in the block 7"-m. These LCT header length fields indicate if LCT header extensions are used, and how many of them are associated with each encoding symbol. These LCT header extensions 68-1-m . . . 68-Mm-m are then contained after the LCT header length fields, respectively.

Figure 5D:
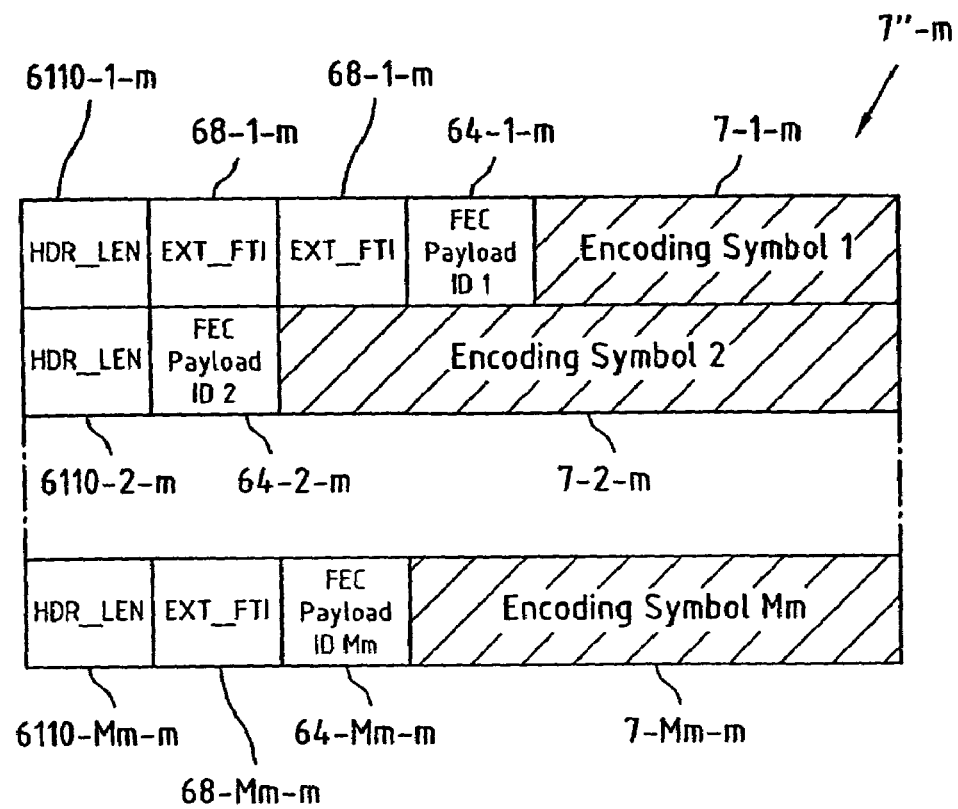
FIG. 5d: a schematic presentation of an alternative block of encoding symbols in case that LCT header extensions are used according to the third embodiment of the present invention.

In the example of FIG. 5d, two EXT_FTI are present in the first encoding symbol, no EXT_FTI in the second encoding symbol, and one EXT_FTI in the last encoding symbol of the block. In this case, the HDR_LEN field 6110 included in the common encoding symbol header (6"-m shown in FIG. 5b) may have no meaning.

It is readily understood that the above-described method for supporting the use of LCT header extensions does also work for EXT-FDT LCT header instances, which are used when encoding symbols belong to a File Distribution Table (FDT) Instance.

Fourth Embodiment of the Invention

Yet another embodiment of the invention is obtained by rearranging the information contained in the PtP HTTP response as described hereinafter with reference to FIGS. 6a-6c.

According to this embodiment of the present invention, FLUTE encoding symbols associated with the same TSI and TOI are once again stored in blocks 7'''-m of FLUTE encoding symbols (with m ranging from 1 to M), and common FLUTE headers are used for the FLUTE encoding symbols of each block; however, in contrast to the third embodiment, the fields of all common FLUTE headers are combined in one index object 6''', and also the FEC Payload IDs of all FLUTE encoding symbols contained in one block 7'''-m of FLUTE encoding symbols are no longer stored in said blocks of FLUTE encoding symbols as in the third embodiment, but in block-specific arrays of FEC Payload IDs 64-1-m . . . 64-Mm-m, which are also incorporated into said index object 6'''. This allows for random access to each desired FLUTE encoding symbol in the PtP HTTP response 9'''.

Figure 6A:
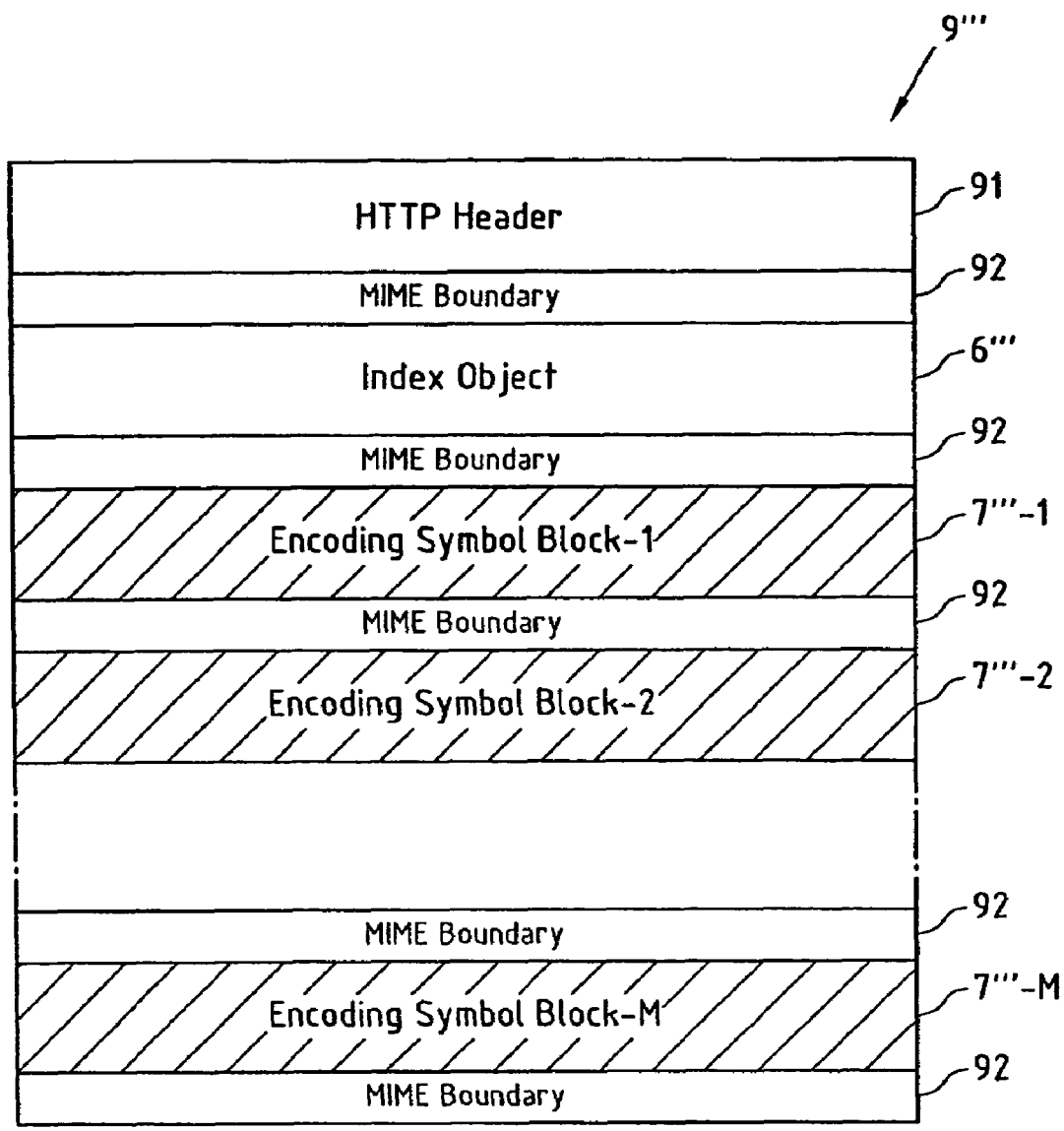
FIG. 6a: a schematic presentation of an HTTP packet according to a fourth embodiment of the resent invention.

This HTTP response (packet) 9''' is illustrated in FIG. 6a. Again, a multipart-MIME structure with MIME boundaries 92 can be used to separate the index object 6''' and the blocks 7'''-m of FLUTE encoding symbols of different types. A new content-type "x-flutePtP/IndexObject" is defined here, which denotes that the message body contains an index object 6'''.

Figure 6B:
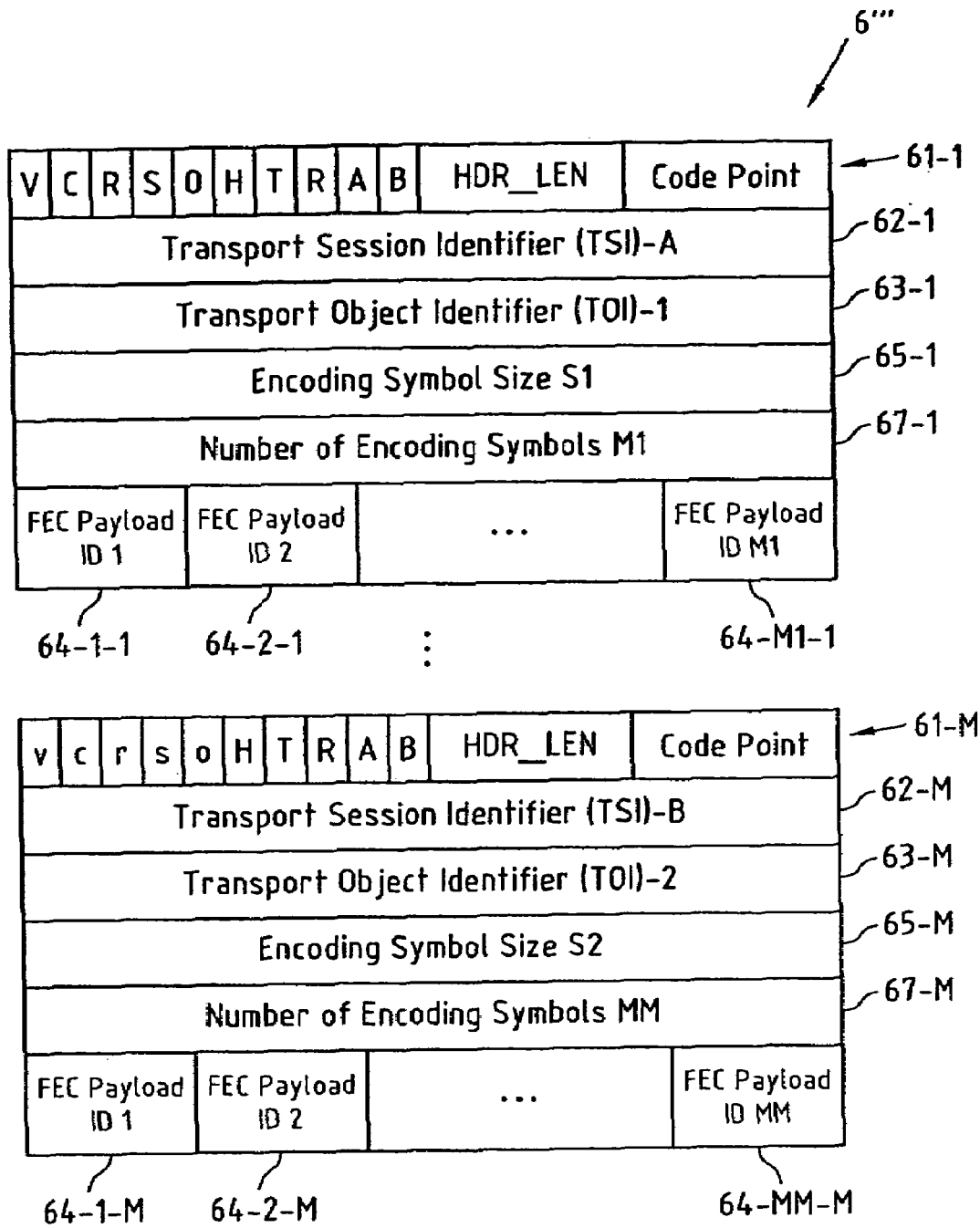
FIG. 6*b*: a schematic presentation of an index object header according to the fourth embodiment of the present invention.
Figure 6C:
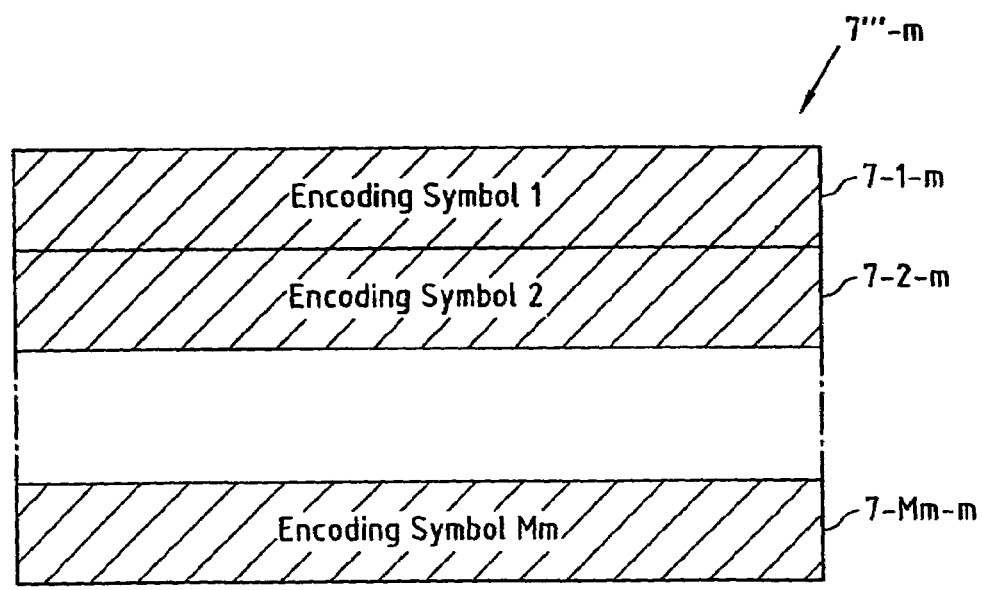
FIG. 6*c*: a schematic presentation of a block of encoding symbols according to the fourth embodiment of the present invention.

FIG. 6b shows the format of the index object 6''' that contains the information (TSI, TOI, Encoding Symbol Length, FEC Payload ID) of all the encoding symbols sent in the HTTP response 9'''. The index object 6''' can be understood to be composed of M sub-headers (modified common FLUTE headers of the third embodiment) indexed with m=1 . . . M, wherein each of said sub-headers relates to a specific TSI, TOI, FLUTE encoding symbol size and, naturally, a number of FLUTE encoding symbols Mm for each block 7'''-m of FLUTE encoding symbols, and wherein these quantities are stored in fields 62-m, 63-m, 65-m and 67-m, respectively. Each of said sub-headers further comprises a portion of an LCT header 61-m, and said block-specific array of FEC Payload IDs 64-1-m. 64-Mm-m.

From this information, the specific receiver 3-1 can map each FEC Payload ID to a unique byte-range in the received byte stream. Thus the specific receiver 3-1 can have random access to any desired encoding symbol. The format of the blocks 7'''-m of FLUTE encoding symbols (with m ranging from 1 to M and M denoting the number of blocks of FLUTE encoding symbols) is shown in FIG. 6c. Apparently, and in contrast to the third embodiment of the present invention, no FEC Payload IDs are contained in the blocks of FLUTE encoding symbols, because these are now contained in the index object 6'''.

The HTTP response 9''' of FIG. 6a may be expressed in pseudo-code as (comments are started with a double forward slash):

```
HTTP/1.1    200    OK
MIME Version:   1.0
Content-Type:   multipart/mixed;
boundary = --BOUNDARY_P2P_REPAIR_RESPONSE
--BOUNDARY_P2P_REPAIR_RESPONSE
Content-Type: x-flutePtP/IndexObject
Content-Transfer-Encoding: binary
// Include the index object that contains all the
// necessary information to access any FLUTE encoding
// Symbol uniquely identified by (TSI, TOI, FEC Payload
// ID).
--BOUNDARY_P2P_REPAIR_RESPONSE
Content-Type: x-flutePtP/encSymbolVideo
Content-Transfer-Encoding: binary
// Include all the FLUTE encoding symbols that belong to
// the Video object.
Encoding Symbol - 1
Encoding Symbol - 2
...
...
Encoding Symbol - M1.
--BOUNDARY_P2P_REPAIR_RESPONSE
Content-Type: x-flutePtP/encSymbolAudio
Content-Transfer-Encoding: binary
// Include all the FLUTE encoding symbols that belong to
// the Audio object.
Encoding Symbol - 1
Encoding Symbol - 2
...
...
Encoding Symbol - M2.
...
...
--BOUNDARY_P2P_REPAIR_RESPONSE
Content-Type: x-flutePtP/encSymbolOther
Content-Transfer-Encoding: binary
//Include all the encoding symbols that belong to the
//"Other" object.
Encoding Symbol - 1
Encoding Symbol - 2
...
...
Encoding Symbol - MM.
--BOUNDARY_P2P_REPAIR_RESPONSE
```

The description of the fourth embodiment of the present invention assumed that no LCT header extensions like EXT_FTI and EXT_FDT are associated with the encoding symbols. It should however be noted that a similar technique as applied in the third embodiment of the present invention (see FIG. 5d) can also be adopted for the fourth embodiment of the present invention. To this end, simply an array of LCT header lengths is included into each sub-header, which indicates for each encoding symbol if and how many LCT header extensions are used. The entries of this array then denote the number of LCT header extensions that are stored in an encoding-symbol specific data structure in each sub-header.

Figure 7:
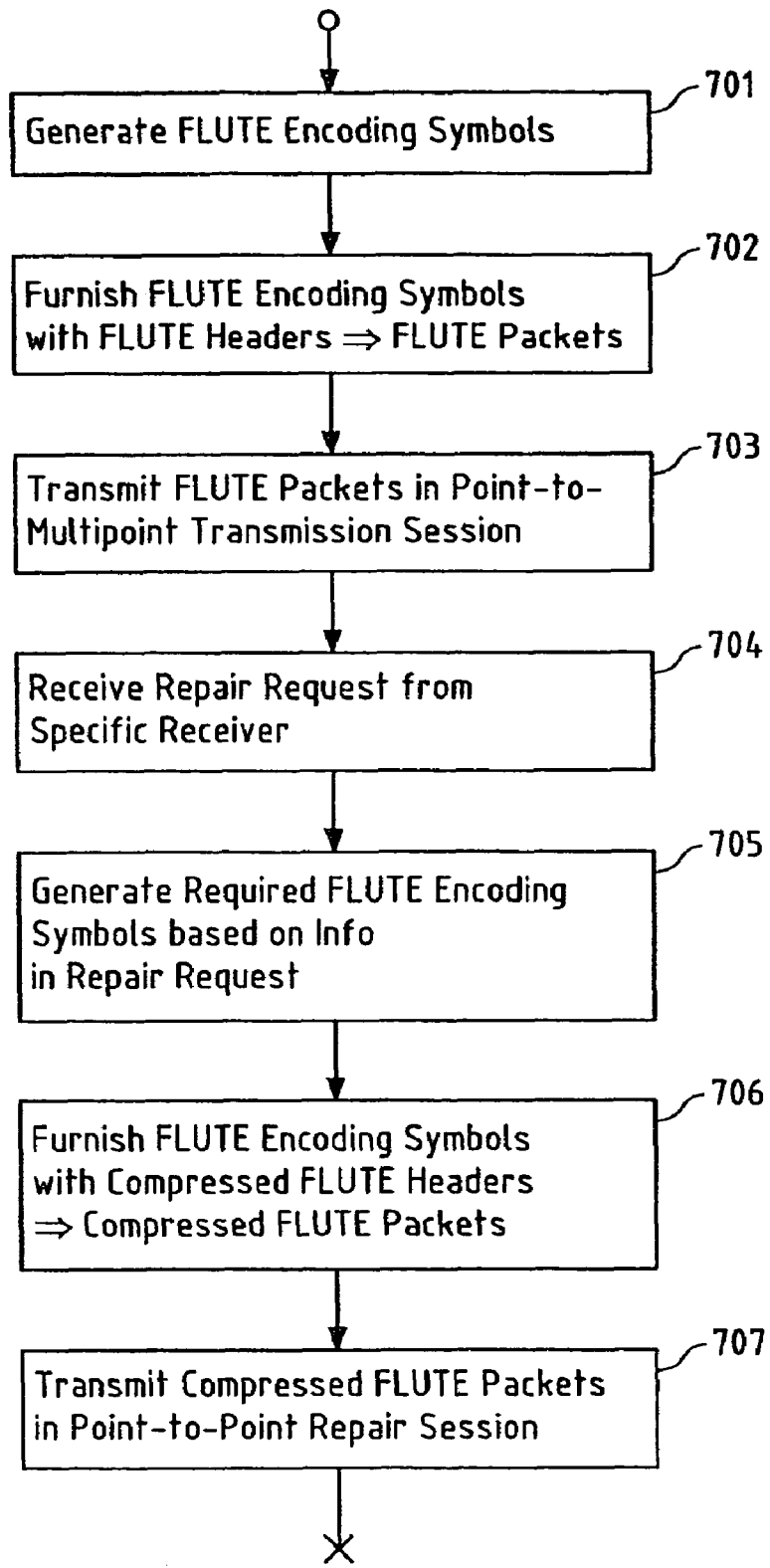
FIG. 7: an exemplary flowchart of the method according to the present invention.

FIG. 7 describes an exemplary flowchart of a method for transmitting data symbols according to the present invention. In this flowchart, for simplicity of presentation, it is assumed that transmitter 1 and repair server 4 are embodied by the same device.

In a first step 701, the transmitter 1 generates FLUTE encoding symbols, for instance by FEC encoding portions of a transport object that is to be transferred to a plurality of receivers 3-1 . . . 3.3 in a PtM session. These FLUTE encoding symbols are then furnished with FLUTE headers (first-type headers) that obey the FLUTE protocol in a step 702, yielding FLUTE packets, that are then transmitted to said plurality of receivers in a step 703. This may for instance be accomplished by using the services of the UDP and the underlying IP protocol. The transmitted FLUTE packets are then received at the receivers 3-1 . . . 3-3, and at at least one of said receivers, the specific receiver 3-1, an additional reception of repair data packets is found to be required due to loss or incorrect reception of packets or due to other reasons. The specific receiver 3-1 then signals a repair request to the repair server, which in this exemplary case, is identical to the transmitter.

At said repair server 4, said repair request is received in a step 704, and the repair information contained therein, for instance a quadruple of TSI, TOI, SBN and ESI of missing FLUTE encoding symbols, is used to determine which FLUTE encoding symbols have to be generated as repair data symbols. This is performed by the repair server 4 in step 705. The generated FLUTE encoding symbols are then furnished with a compressed FLUTE header (second-type header) obeying the FLUTE protocol in step 706, for instance the compressed FLUTE header 6 of the first embodiment of the present invention according to FIG. 3a. The FLUTE encoding symbols and the compressed FLUTE header then form the compressed FLUTE packet 8 of FIG. 3a. This compressed FLUTE packet 8 is then transmitted by the repair server to the specific receiver within a PtP repair session, see step 707, for instance by embedding a plurality of compressed FLUTE packets 8-1 . . . 8-M into one HTTP packet 9 (see FIG. 3b) that serves as a response to the repair request, and by using the services of the HTTP/TCP to transfer these HTTP packet between entities of the repair server 4 and the specific receiver 3-1.

The invention has been described above by means of preferred embodiments. It should be noted that there are alternative ways and variations which are obvious to a skilled person in the art and can be implemented without deviating from the scope and spirit of the appended claims. In particular, the scope of the present invention shall by not means be restricted to application in the context of the FLUTE protocol or the 3GPP MBMS system. This is due to the fact that the inventive principle of using different types of headers of the same protocol for PtM transmissions on the one hand and PtP transmission on the other hand is not bound to any specific protocol or system.

The invention claimed is:

1. A method for transmitting data symbols, comprising:
transmitting one or more data symbols from a transmitter to one or more receivers within a point-to-multipoint transmission session, wherein said data symbols are furnished with first-type headers obeying a file delivery protocol, and wherein in said point-to-multipoint transmission session, said file delivery protocol uses the services of the User Datagram Protocol; and
transmitting one or more repair data symbols from a repair server to one specific receiver of said receivers within a point-to-point repair session, wherein said repair data symbols are furnished with one or more second-type headers at least partially obeying said same file delivery protocol, and wherein said second-type headers represent a modification of said first-type headers obtained by removing at least one parameter of said first-type headers.

2. The method according to claim 1, wherein said first-type header contains at least one parameter that is not contained in said second-type header, and wherein said parameter is related to point-to-multipoint transmission.

3. The method according to claim 1, wherein in said point-to-point repair session, said file delivery protocol uses the services of the Transmission Control Protocol.

4. The method according to claim 1, wherein in said point-to-point repair session, said file delivery protocol uses the services of the Hypertext Transfer Protocol.

5. The method according to claim 1, wherein said file delivery protocol is the File Delivery over Unidirectional Transport, protocol, and wherein said data symbols and said repair data symbols represent encoding symbols of the File Delivery over Unidirectional Transport protocol.

6. The method according to claim 1, wherein a combination of one encoding symbol of the File Delivery over Unidirectional Transport protocol and one associated second-type header forms a compressed packet of the File Delivery over Unidirectional Transport protocol, wherein a Hypertext Transfer Protocol, transfers Hypertext Transfer Protocol packets between said repair server and said specific receiver, and wherein at least one of said Hypertext Transfer Protocol packets comprises a Hypertext Transfer Protocol packet header and one or more of said compressed packets of the File Delivery over Unidirectional Transport protocol.

7. The method according to claim 6, wherein said second-type header of said compressed packets of the File Delivery over Unidirectional Transport protocol at least comprises a portion of a Layered Coding Transport header, an identifier of said encoding symbol of the File Delivery over Unidirectional Transport protocol in said compressed packet of the File Delivery over Unidirectional Transport protocol, and a size of said encoding symbol of the File Delivery over Unidirectional Transport protocol.

8. The method according to claim 7, wherein said second-type header further comprises an identifier of said point-to-multipoint transmission session.

9. The method according to claim 7, wherein said second-type header further comprises an identifier of a transport object said encoding symbols of the File Delivery over Unidirectional Transfer protocol are related to.

10. The method according to claim 7, wherein said second-type header further comprises Layered Coding Transport header extensions.

11. The method according to claim 7, wherein said portion of said Layered Coding Transport header comprises a Layered Coding Transport version number, a Congestion Control flag, a reserved space, a Transport Session Identifier flag, a Transport Object Identifier TOI flag, a Half-word flag, a Sender Current Time flag, an Expected Residual Time flag, a Close Session flag, a Close Object flag, a Layered Coding Transport header length, and a Code Point.

12. The method according to claim 6, wherein said at least one Hypertext Transfer Protocol packet has a multipart Multipurpose Internet Mail Extensions, structure, and wherein said compressed packets of the File Delivery over Unidirectional Transport protocol are separated from said Hypertext Transfer Protocol packet header and from each other by Multipurpose Internet Mail Extension boundaries.

13. The method according to claim 12, wherein said second-type header of said compressed packets of the File Delivery over Unidirectional Transport protocol comprises a portion of a Layered Coding Transport header and an identifier of said encoding symbol of the File Delivery over Unidirectional Transport protocol in said compressed packet of the File Delivery over Unidirectional Transport protocol.

14. The method of claim 13, wherein said second-type header further comprises an identifier of said point-to-multipoint transmission session.

15. The method of claim 13, wherein said second-type header further comprises an identifier of a transport object said encoding symbols of the File Delivery over Unidirectional Transfer protocol are related to.

16. The method of claim 13, wherein said second-type header further comprises Layered Coding Transport header extensions.

17. The method of claim 13, wherein said portion of said Layered Coding Transport header comprises a Layered Coding Transport version number, a Congestion Control flag, a reserved space, a Transport Session Identifier flag, a Transport Object Identifier flag, a Half-word flag, a Sender Current Time flag, an Expected Residual Time flag, a Close Session flag, a Close Object flag, a Layered Coding Transport header length, and a Code Point.

18. The method according to claim 1, wherein a Hypertext Transfer Protocol transfers Hypertext Transfer Protocol packets between said repair server and said specific receiver, wherein at least one of said Hypertext Transfer Protocol packets comprises a Hypertext Transfer Protocol packet header, one or more blocks that comprise at least two encoding symbols of the File Delivery over Unidirectional Transport protocol and respective associated identifiers, and one respective second-type header for each of said blocks, and wherein each respective second-type header is valid for all encoding symbols of the File Delivery over Unidirectional Transport protocol of a respective block.

19. The method according to claim 18, wherein said at least one Hypertext Transfer Protocol packet has a Multipurpose Internet Mail Extension structure, and wherein said Hypertext Transfer Protocol packet header, said blocks and said second-type headers are mutually separated by Multipurpose Internet Mail Extension boundaries.

20. The method according to claim 19, wherein said respective second-type headers comprise a portion of a Layered Coding Transport header and a size of said encoding symbols of the File Delivery over Unidirectional Transport protocol in said respective blocks.

21. The method of claim 20, wherein said second-type header further comprises an identifier of said point-to-multipoint transmission session.

22. The method of claim 20, wherein said second-type header further comprises an identifier of a transport object said encoding symbols of the File Delivery over Unidirectional Transfer protocol are related to.

23. The method of claim 20, wherein said second-type header further comprises Layered Coding Transport header extensions.

24. The method of claim 20, wherein said portion of said Layered Coding Transport header comprises a Layered Coding Transport version number, a Congestion Control flag, a reserved space, a Transport Session Identifier flag, a Transport Object Identifier TOI flag, a Half-word flag, a Sender Current Time flag, an Expected Residual Time flag, a Close Session flag, a Close Object flag, a Layered Coding Transport header length, and a Code Point.

25. The method according to claim 18, wherein at least one of said blocks comprises an encoding symbol of the File Delivery over Unidirectional Transport protocol, a respective associated identifier, a respective Layered Coding Transport header length and at least one Layered Coding Transport header extension.

26. The method according to claim 1, wherein a Hypertext Transfer Protocol transfers Hypertext Transfer Protocol packets between said repair server and said specific receiver, wherein at least one of said Hypertext Transfer Protocol packets comprises a Hypertext Transfer Protocol packet header, one second-type header and one or more blocks that comprise at least two encoding symbols of the File Delivery over Unidirectional Transport protocol.

27. The method according to claim 26, wherein said at least one Hypertext Transfer Protocol packet has a Multi-purpose Internet Mail Extension structure, and wherein said Hypertext Transfer Protocol packet header, said one second-type header and said one or more blocks are mutually separated by Multipurpose Internet Mail Extension boundaries.

28. The method according to claim 27, wherein said second-type header comprises one respective sub-header for each respective block in said Hypertext Transfer Protocol packet, and wherein each of said respective sub-headers comprises a portion of a Layered Coding Transport header, the size of said encoding symbols of the File Delivery over Unidirectional Transfer protocol in said respective block, the number of encoding symbols of the File Delivery over Unidirectional Transfer protocol in said respective block, and one identifier for each encoding symbol of the File Delivery over Unidirectional Transfer protocol in said respective block.

29. The method according to claim 28, wherein at least one of said sub-headers comprises one Layered Coding Transport header length for each encoding symbol of the File Delivery over Unidirectional Transfer protocol in said respective block, and at least one Layered Coding Transport header extension for at least one of said encoding symbols of the File Delivery over Unidirectional Transfer protocol in said respective block.

30. The method of claim 28, wherein said second-type header further comprises an identifier of said point-to-multipoint transmission session.

31. The method of claim 28, wherein said second-type header further comprises an identifier of a transport object said encoding symbols of the File Delivery over Unidirectional Transfer protocol are related to.

32. The method of claim 28, wherein said second-type header further comprises Layered Coding Transport header extensions.

33. The method of claim 28, wherein said portion of said Layered Coding Transport header comprises a Layered Coding Transport version number, a Congestion Control flag, a reserved space, a Transport Session Identifier flag, a Transport Object Identifier flag, a Half-word flag, a Sender Current Time flag, an Expected Residual Time flag, a Close Session flag, a Close Object flag, a Layered Coding Transport header length, and a Code Point.

34. The method according to claim 1, wherein said file delivery protocol is the File Delivery over Unidirectional Transport protocol.

35. The method according to claim 1, wherein the point-to-multipoint session is a third generation partnership project multimedia broadcast/multicast service session.

36. A system for transmitting data symbols, comprising:
a transmitter,
one or more receivers, and
a repair server, wherein one or more data symbols are transmitted from said transmitter to said one or more receivers within a point-to-multipoint transmission session, wherein said data symbols are furnished with first-type headers obeying a file delivery protocol, wherein in said point-to-multipoint transmission session, said file delivery protocol uses the services of the User Datagram Protocol, wherein one or more repair data symbols are transmitted from said repair server to one specific receiver of said receivers within a point-to-point repair session, wherein said repair data symbols are furnished with one or more second-type headers at least partially obeying said same file delivery protocol, and wherein said second-type headers represent a modification of said first-type headers obtained by removing at least one parameter of said first-type headers.

37. The system according to claim 36, wherein said file delivery protocol is the File Delivery over Unidirectional Transport protocol.

38. The system according to claim 36, wherein the point-to-multipoint session is a third generation partnership project multimedia broadcast/multicast service session.

39. A transmitter in a system for transmitting data symbols, said transmitter configured to transmit one or more data symbols from said transmitter to one or more receivers within a point-to-multipoint transmission session, wherein said data symbols are furnished with first-type headers obeying a file delivery protocol, wherein in said point-to-multipoint transmission session, said file delivery protocol uses the services of the User Datagram Protocol, wherein one or more repair data symbols are transmitted from a repair server to one specific receiver of said receivers within a point-to-point repair session, wherein said repair data symbols are furnished with one or more second-type headers at least partially obeying said same file delivery protocol, and wherein said second-type headers represent a modification of said first-type headers obtained by removing at least one parameter of said first-type headers.

40. The transmitter according to claim 39, wherein said file delivery protocol is the File Delivery over Unidirectional Transport protocol.

41. The transmitter according to claim 39, wherein the point-to-multipoint session is a third generation partnership project multimedia broadcast/multicast service session.

42. A network element in a system for transmitting data symbols, wherein one or more data symbols are transmitted from a transmitter to one or more receivers within a point-to-multipoint transmission session, wherein said data symbols are furnished with first-type headers obeying a file delivery protocol, and wherein in said point-to-multipoint transmission session, said file delivery protocol uses the services of the User Datagram Protocol, said network element configured to transmit one or more repair data symbols from said network element to one specific receiver of said receivers within a point-to-point repair session, wherein said repair data symbols are furnished with one or more second-type headers at least partially obeying said same file delivery protocol, and wherein said second-type headers represent a modification of said first-type headers obtained by removing at least one parameter of said first-type headers.

43. The network element according to claim 42, wherein said file delivery protocol is the File Delivery over Unidirectional Transport protocol.

44. The network element according to claim 42, wherein the point-to-multipoint session is a third generation partnership project multimedia broadcast/multicast service session.

45. A computer readable medium having a software application stored thereon and executable in a network element of a system for transmitting data symbols, wherein one or more data symbols are transmitted from a transmitter to one or more receivers within a point-to-multipoint transmission session, and-wherein said data symbols are furnished with first-type headers obeying a file delivery protocol, wherein in said point-to-multipoint transmission session, said file delivery protocol uses the services of the User Datagram Protocol, the software application comprising:

program code for causing the network element to transmit one or more repair data symbols from said network element to one specific receiver of said receivers within a point-to-point repair session, wherein said repair data symbols are furnished with one or more second-type headers at least partially obeying said same file delivery protocol, and wherein said second-type headers represent a modification of said first-type headers obtained by removing at least one parameter of said first-type headers.

46. The software application according to claim 45, wherein said file delivery protocol is the File Delivery over Unidirectional Transport protocol.

47. The software application according to claim 45, wherein the point-to-multipoint session is a third generation partnership project multimedia broadcast/multicast service session.

48. A receiver in a system for transmitting data symbols, said receiver configured to receive one or more data symbols transmitted from a transmitter to one or more receivers within a point-to-multipoint transmission session, wherein said data symbols are furnished with first-type headers obeying a file delivery protocol, and wherein in said point-to-multipoint transmission session, said file delivery protocol uses the services of the User Datagram Protocol; and configured to receive one or more repair data symbols from a repair server within a point-to-point repair session, wherein said repair data symbols are furnished with one or more second-type headers at least partially obeying said same file delivery protocol, and wherein said second-type headers represent a modification of said first-type headers obtained by removing at least one parameter of said first-type headers.

49. The receiver according to claim 48, wherein said file delivery protocol is the File Delivery over Unidirectional Transport protocol.

50. The receiver according to claim 48, wherein the point-to-multipoint session is a third generation partnership project multimedia broadcast/multicastservice session.

51. A computer readable medium having a software application stored thereon and executable in a receiver of a system for transmitting data symbols, the software application comprising:

program code for causing the receiver to receive one or more data symbols transmitted from a transmitter to one or more receivers within a point-to-multipoint transmission session, wherein said data symbols are furnished with first-type headers obeying a file delivery protocol, and wherein in said point-to-multipoint transmission session, said file delivery protocol uses the services of the User Datagram Protocol; and program code for causing the receiver to receive one or more repair data symbols from a repair server within a point-to-point repair session, wherein said repair data symbols are furnished with one or more second-type headers at least partially obeying said same file delivery protocol, and wherein said second-type headers represent a modification of said first-type headers obtained by removing at least one parameter of said first-type headers.

52. The software application according to claim 51, wherein said file delivery protocol is the File Delivery over Unidirectional Transport protocol.

53. The software application according to claim 51, wherein the point-to-multipoint session is a third generation partnership project multimedia broadcast/multicast service session.

* * * * *

UNITED STATES PATENT AND TRADEMARK OFFICE
CERTIFICATE OF CORRECTION

| | |
|---|---|
| PATENT NO. | : 7,376,150 B2 |
| APPLICATION NO. | : 10/903260 |
| DATED | : May 20, 2008 |
| INVENTOR(S) | : Ramakrishna Vedantham et al. |

It is certified that error appears in the above-identified patent and that said Letters Patent is hereby corrected as shown below:

In column 23, line 4 "and-" should be deleted.

In column 24, line 9 "multicastservice" should be --multicast service--.

Signed and Sealed this

Ninth Day of December, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,376,150 B2 |
| APPLICATION NO. | : 10/903260 |
| DATED | : May 20, 2008 |
| INVENTOR(S) | : Ramakrishna Vedantham et al. |

It is certified that error appears in the above-identified patent and that said Letters Patent is hereby corrected as shown below:

In the Claims:

In column 23, line 20, claim 46, "software application" should be --computer readable medium--.
In column 23, line 23, claim 47, "software application" should be --computer readable medium--.
In column 24, line 32, claim 52, "software application" should be --computer readable medium--.
In column 24, line 35, claim 53, "software application" should be --computer readable medium--.

Signed and Sealed this
Twenty-third Day of July, 2013

Teresa Stanek Rea
*Acting Director of the United States Patent and Trademark Office*